United States Patent
Sampica et al.

(10) Patent No.: US 8,936,057 B2
(45) Date of Patent: Jan. 20, 2015

(54) SUBSTRATE LAMINATION SYSTEM AND METHOD

(75) Inventors: James D. Sampica, Springville, IA (US); Paul R. Nemeth, Cedar Rapids, IA (US); Tracy J. Barnidge, Marion, IA (US); Vincent P. Marzen, Robins, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 1075 days.

(21) Appl. No.: 12/009,482

(22) Filed: Jan. 18, 2008

(65) Prior Publication Data

US 2009/0120585 A1    May 14, 2009

Related U.S. Application Data

(63) Continuation-in-part of application No. 11/214,518, filed on Aug. 30, 2005, now Pat. No. 7,566,254, and a continuation-in-part of application No. 11/215,683, filed on Aug. 30, 2005, now Pat. No. 7,435,311, and a
(Continued)

(51) Int. Cl.
B32B 37/00 (2006.01)
B32B 37/10 (2006.01)
B32B 38/18 (2006.01)

(52) U.S. Cl.
CPC .......... B32B 37/003 (2013.01); B32B 37/0046 (2013.01); B32B 37/10 (2013.01); B32B 37/1009 (2013.01); B32B 38/1841 (2013.01); B32B 2457/202 (2013.01)
USPC .......... 156/382; 156/104; 156/106; 156/285; 156/286

(58) Field of Classification Search
CPC .. B32B 37/12; B32B 37/003; B32B 2309/68; B32B 37/1009; B32B 37/1018; B32B 37/00; B32B 38/1833; H01L 21/67126; G02F 1/1303; B29C 2043/3233; B29C 2043/3647; B29C 2791/006; B29C 43/56

USPC .......... 156/104, 106, 285, 286, 382
See application file for complete search history.

(56) References Cited

U.S. PATENT DOCUMENTS 3,089,801 A   5/1963   Tierney et al.
3,616,197 A   10/1971  Amberg et al.
(Continued)

FOREIGN PATENT DOCUMENTS

EP   962752 A1   4/1988
EP   0556351 B1  8/1993
(Continued)

OTHER PUBLICATIONS

Kipp, Dale O. (2004; 2010). Plastic Material Data Sheets. MatWeb—Division of Automation Creation, Inc. Online version available at: http://www.knovel.com/web/portal/browse/display?_EXT_KNOVEL_DISPLAY_bookid=1023&VerticalID =.*
(Continued)

*Primary Examiner* — Jeff Aftergut
*Assistant Examiner* — Joshel Rivera
(74) *Attorney, Agent, or Firm* — Donna P. Suchy; Daniel M. Barbieri

(57) ABSTRACT

The present disclosure is directed to a substrate lamination system and method.
A substrate lamination apparatus may comprise: (a) a vacuum chamber; (b) a flexible membrane; and (c) a substrate support. A system for laminating substrates may comprise: (a) a vacuum chamber; (b) a flexible membrane; (c) a substrate support; (d) a vacuum pump; (e) a compressor; and (f) a control unit, wherein the control unit is configured to carry out the steps: (i) evacuating the vacuum chamber; and (ii) applying pressure to at least one of a first substrate and a second substrate.

33 Claims, 18 Drawing Sheets

Related U.S. Application Data continuation-in-part of application No. 12/009,375, filed on Jan. 18, 2008, now Pat. No. 8,691,043, and a continuation-in-part of application No. 12/009,372, filed on Jan. 18, 2008, now Pat. No. 8,118,075, and a continuation-in-part of application No. 12/009,393, filed on Jan. 18, 2008, now Pat. No. 8,137,498, and a continuation-in-part of application No. 12/009,373, filed on Jan. 18, 2008, now Pat. No. 7,814,676, and a continuation-in-part of application No. 12/009,472, filed on Jan. 18, 2008, now Pat. No. 8,603,288.

(56) References Cited

U.S. PATENT DOCUMENTS

| | | | |
|---|---|---|---|
| 3,851,758 | A | 12/1974 | Makhijani et al. |
| 4,078,962 | A * | 3/1978 | Krueger ................ 156/497 |
| 4,188,254 | A * | 2/1980 | Hemperly, Jr. ............ 156/382 |
| 4,235,951 | A | 11/1980 | Swarovski |
| 4,737,182 | A * | 4/1988 | Fecik et al. ............... 65/106 |
| 4,747,577 | A * | 5/1988 | Dimock ................. 251/158 |
| 4,756,735 | A * | 7/1988 | Cathers et al. ............. 65/106 |
| 5,108,532 | A | 4/1992 | Thein et al. |
| 5,273,553 | A | 12/1993 | Hoshi et al. |
| 5,329,391 | A | 7/1994 | Miyamoto et al. |
| 5,365,356 | A | 11/1994 | McFadden |
| 5,566,840 | A | 10/1996 | Waldner et al. |
| 5,592,288 | A | 1/1997 | Sampica et al. |
| 5,678,303 | A | 10/1997 | Wichmann |
| 5,918,517 | A | 7/1999 | Malapert et al. |
| 5,942,062 | A | 8/1999 | Hassall et al. |
| 5,950,512 | A | 9/1999 | Fields |
| 5,959,762 | A | 9/1999 | Bandettini et al. |
| 6,128,066 | A | 10/2000 | Yokozeki |
| 6,366,013 | B1 | 4/2002 | Leenders et al. |
| 6,388,724 | B1 | 5/2002 | Campbell et al. |
| 6,481,482 | B1 | 11/2002 | Shimotomai |
| 6,614,057 | B2 | 9/2003 | Silvernail et al. |
| 6,681,668 | B1 | 1/2004 | Smirle |
| 6,739,929 | B2 | 5/2004 | Furukawa et al. |
| 6,760,155 | B2 | 7/2004 | Murayama et al. |
| 6,803,245 | B2 | 10/2004 | Auch et al. |
| 6,832,538 | B1 | 12/2004 | Hwang |
| 6,842,288 | B1 | 1/2005 | Liu et al. |
| 6,908,202 | B2 | 6/2005 | Graf et al. |
| 6,917,396 | B2 | 7/2005 | Hiraishi et al. |
| 6,984,545 | B2 | 1/2006 | Grigg et al. |
| 6,998,648 | B2 | 2/2006 | Silvernail |
| 7,030,945 | B2 | 4/2006 | Umemoto et al. |
| 7,273,403 | B2 | 9/2007 | Yokota et al. |
| 7,349,154 | B2 | 3/2008 | Aiura et al. |
| 7,361,240 | B2 | 4/2008 | Kim |
| 7,381,110 | B1 | 6/2008 | Sampica et al. |
| 7,435,311 | B1 | 10/2008 | Marzen et al. |
| 7,446,938 | B2 | 11/2008 | Miyatake et al. |
| 7,452,258 | B1 | 11/2008 | Marzen et al. |
| 7,528,915 | B2 | 5/2009 | Choi et al. |
| 7,551,451 | B2 | 6/2009 | Kim et al. |
| 7,633,584 | B2 | 12/2009 | Umemoto et al. |
| 7,814,676 | B2 | 10/2010 | Sampica et al. |
| 7,927,440 | B2 | 4/2011 | Matsuhira |
| 7,929,086 | B2 | 4/2011 | Toyama et al. |
| 8,038,498 | B2 | 10/2011 | Miyauchi et al. |
| 8,045,098 | B2 | 10/2011 | Kitagawa et al. |
| 8,102,487 | B2 | 1/2012 | Kitagawa et al. |
| 8,118,075 | B2 | 2/2012 | Sampica et al. |
| 8,137,498 | B2 | 3/2012 | Sampica et al. |
| 8,486,535 | B1 | 7/2013 | Nemeth et al. |
| 2001/0050372 | A1 | 12/2001 | Krijn et al. |
| 2001/0053648 | A1 | 12/2001 | Furukawa et al. |
| 2002/0179229 | A1 | 12/2002 | Chuzles |
| 2002/0186343 | A1* | 12/2002 | Liao et al. ............... 349/187 |
| 2002/0187284 | A1 | 12/2002 | Kinoshita et al. |
| 2003/0038916 | A1 | 2/2003 | Nakano et al. |
| 2003/0043315 | A1 | 3/2003 | Umemoto et al. |
| 2003/0089214 | A1 | 5/2003 | Fukuta et al. |
| 2003/0156238 | A1 | 8/2003 | Hiraishi et al. |
| 2003/0174396 | A1 | 9/2003 | Murayama et al. |
| 2003/0180528 | A1 | 9/2003 | Flosenzier et al. |
| 2003/0189606 | A1 | 10/2003 | Moon et al. |
| 2004/0066645 | A1 | 4/2004 | Graf et al. |
| 2005/0126679 | A1 | 6/2005 | Kim |
| 2005/0136625 | A1 | 6/2005 | Henseler et al. |
| 2005/0249946 | A1 | 11/2005 | Hsu et al. |
| 2006/0035060 | A1 | 2/2006 | Koyama et al. |
| 2006/0098452 | A1 | 5/2006 | Choi et al. |
| 2006/0207967 | A1 | 9/2006 | Bocko et al. |
| 2006/0215265 | A1 | 9/2006 | Miyatake et al. |
| 2006/0245171 | A1 | 11/2006 | Kim et al. |
| 2006/0290253 | A1 | 12/2006 | Yeo et al. |
| 2007/0031997 | A1 | 2/2007 | Lee et al. |
| 2007/0228586 | A1 | 10/2007 | Merrill et al. |
| 2007/0297736 | A1 | 12/2007 | Sherman et al. |
| 2008/0145610 | A1 | 6/2008 | Muller et al. |
| 2008/0305721 | A1 | 12/2008 | Ohashi et al. |
| 2009/0040772 | A1 | 2/2009 | Laney |
| 2009/0046229 | A1 | 2/2009 | Umemoto et al. |
| 2009/0120572 | A1 | 5/2009 | Sampica et al. |
| 2009/0126872 | A1 | 5/2009 | Sampica et al. |
| 2009/0148682 | A1 | 6/2009 | Higuchi |
| 2009/0153783 | A1 | 6/2009 | Umemoto |
| 2009/0183381 | A1 | 7/2009 | Sampica et al. |
| 2009/0183615 | A1 | 7/2009 | Sampica et al. |
| 2009/0186218 | A1 | 7/2009 | Sampica et al. |
| 2009/0279030 | A1 | 11/2009 | Toyama et al. |
| 2009/0279175 | A1 | 11/2009 | Laney et al. |
| 2010/0103353 | A1 | 4/2010 | Yamada |
| 2010/0297406 | A1 | 11/2010 | Schaffer et al. |
| 2011/0075070 | A1 | 3/2011 | Kitagawa et al. |
| 2011/0141405 | A1 | 6/2011 | Kitagawa et al. |
| 2011/0165361 | A1 | 7/2011 | Sherman et al. |

FOREIGN PATENT DOCUMENTS

| | | |
|---|---|---|
| EP | 0711103 B1 | 5/1996 |
| JP | 1-210328 A | 8/1989 |
| JP | 5-200880 A | 8/1993 |
| JP | 5-293895 A | 11/1993 |
| JP | 6-051484 A | 2/1994 |
| JP | 9-057779 A | 3/1997 |
| JP | 10-156853 A | 6/1998 |
| JP | 10-244589 A | 9/1998 |
| JP | 2000-141388 A | 5/2000 |
| JP | 2001-005401 | 1/2001 |
| JP | 2001-166272 | 6/2001 |
| JP | 2002-137352 | 5/2002 |
| JP | 2002-313688 | 10/2002 |
| JP | 2004-058349 | 2/2004 |
| JP | 2004-233590 A | 8/2004 |
| JP | 2004-354645 | 12/2004 |
| JP | 2006-218658 A | 8/2006 |
| JP | 2006-222267 | 8/2006 |
| JP | 2006-290960 | 10/2006 |
| JP | 2006-334912 A | 12/2006 |
| JP | 2006-348208 | 12/2006 |
| JP | 2007-206559 A | 8/2007 |
| JP | 2008-238607 A | 10/2008 |
| KR | 10-1999-0029922 | 4/1999 |
| KR | 10-2007-0016614 | 2/2007 |
| WO | PCT/US92/07118 | 3/1993 |
| WO | WO 93/05634 | 3/1993 |
| WO | WO 2004/046230 | 6/2004 |
| WO | WO 2005/098522 | 10/2005 |
| WO | WO 2007/063818 | 6/2007 |

OTHER PUBLICATIONS

U.S. Appl. No. 12/009,472, filed Jan. 18, 2008, Sampica et al.
U.S. Appl. No. 12/009,393, filed Jan. 18, 2008, Barnidge et al.
U.S. Appl. No. 12/009,375, filed Jan. 18, 2008, Sampica et al.
U.S. Appl. No. 12/009,373, filed Jan. 18, 2008, Sampica et al.
U.S. Appl. No. 12/009,372, filed Jan. 18, 2008, Sampica et al.
U.S. Appl. No. 11/214,518, filed Aug. 30, 2005, Sampica et al.

(56) References Cited

OTHER PUBLICATIONS

Geoff Walker, GD-Itronix Dynavue Technology: The Ultimate Outdoor-Readable Touch-Screen Display, Rugged PC Review, pp. 1-4, Publisher: Rugged PC Review, Published in: US.
US Office Action for U.S. Appl. No. 12/009,373, mail date Dec. 30, 2009, 14 pages.
Office Action for U.S. Appl. No. 12/009,482, mail date Feb. 21, 2012, 20 pages.
Office Action for U.S. Appl. No. 12/786,169, mail date Jul. 20, 2012, 8 pages.
Office Action for U.S. Appl. No. 12/009,482, mail date Aug. 16, 2011, 16 pages.
Office Action for U.S. Appl. No. 13/420,381, mail date Sep. 18, 2012, 9 pages.
Office Action for U.S. Appl. No. 13/538,957, mail date Oct. 5, 2012, 18 pages.
Office Action for U.S. Appl. No. 12/009,472, mail date Nov. 9, 2012, 15 pages.
Office Action for U.S. Appl. No. 12/009,482, mail date Nov. 21, 2012, 20 pages.
Office Action for U.S. Appl. No. 12/786,169, mail date Jan. 18, 2013, 14 pages.
Notice of Allowance for U.S. Appl. No. 13/420,381, mail date Feb. 11, 2013, 12 pages.
Office Action for U.S. Appl. No. 13/538,957, mail date Apr. 4, 2013, 19 pages.
Notice of Allowance for U.S. Appl. No. 12/009,373, mail date Jun. 16, 2010, 4 pages.
Notice of Allowance for U.S. Appl. No. 12/009,372, mail date Oct. 13, 2011, 8 pages.
Notice of Allowance for U.S. Appl. No. 12/009,393, mail date Nov. 14, 2011, 7 pages.
Office Action for U.S. Appl. No. 12/009,372, mail date Dec. 20, 2010, 10 pages.
Office Action for U.S. Appl. No. 12/009,472, mail date Jan. 14, 2011, 14 pages.
Office Action for U.S. Appl. No. 12/009,375, mail date Mar. 28, 2011, 9 pages.
Office Action for U.S. Appl. No. 12/009,372, mail date Jun. 13, 2011, 9 pages.
Office Action for U.S. Appl. No. 12/009,393, mail date Jul. 20, 2011, 8 pages.
Office Action for U.S. Appl. No. 12/009,375, mail date Jul. 22, 2011, 8 pages.
Office Action for U.S. Appl. No. 12/009,472, mail date Nov. 3, 2011, 15 pages.
Office Action for U.S. Appl. No. 12/009,472, mail date Apr. 16, 2012, 16 pages.
Advisory Action for U.S. Appl. No. 12/009,472, mail date Feb. 25, 2013, 3 pages.
Office Action for U.S. Appl. No. 12/009,472, mail date Mar. 20, 2013, 15 pages.
Notice of Allowance for U.S. Appl. No. 12/786,169, mail date Mar. 28, 2013, 6 pages.
International Search Report for Application No. PCT/US2009/031151, mail date Aug. 28, 2009, 3 pages.
Notice of Allowance for U.S. Appl. No. 12/009,472, mail date Sep. 5, 2013, 8 pages.
Notice of Allowance for U.S. Appl. No. 13/538,957, mail date Oct. 3, 2013, 13 pages.
Office Action for Chinese Application No. 200980107294.5, mail date Oct. 8, 2013, 5 pages.
Advisory Action for U.S. Appl. No. 13/538,957, mail date Jun. 14, 2013, 6 pages.
Notice of Allowance for U.S. Appl. No. 13/420,381, mail date May 20, 2013, 8 pages.
Office Action for U.S. Appl. No. 12/009,375, mail date Jul. 3, 2013, 14 pages.
Office Action on U.S. Appl. No. 13/867,556 Dated Feb. 7, 2014, 11 pages.
Extended European Search Report for European Patent Application No. 14161363, dated May 16, 2014, 6 pages.
Final Office Action on U.S. Appl. No. 13/867,556 Dated Jul. 3, 2014, 11 pages.
Notice of Allowance for U.S. Appl. No. 12/009,375, mail date Nov. 21, 2013, 12 pages.
Notice of Allowance on U.S. Appl. No. 14/019,429 Dated Feb. 5, 2014, 7 pages.
Restriction Requirement for U.S. Appl. No. 13/867,556, mail date Dec. 26, 2013, 6 pages.
Second Office Action for Chinese Patent Application No. 2009801072945, dated May 30, 2014 with English translation, 4 pages.

* cited by examiner

SUBSTRATE LAMINATION SYSTEM AND METHOD

The present application constitutes a continuation-in-part of U.S. patent application Ser. No. 11/214,518, entitled PROCESS FOR GLASS-TO-GLASS SEALING OLEDS WITH DRY FILM ADHESIVE, naming James D. Sampica, Paul R. Nemeth and Vincent P. Marzen as inventors, filed Aug. 30, 2005 now U.S. Pat. No. 7,566,254, which is currently, or is an application of which a currently application is entitled to the benefit of the filing date.

The present application constitutes a continuation-in-part of U.S. patent application Ser. No. 11/215,683, entitled PANEL-TO-PANEL LAMINATION METHOD FOR IMPROVED UNIFORMITY, naming Vincent P. Marzen, Paul R. Nemeth and James D. Sampica as inventors, filed Aug. 30, 2005 now U.S. Pat. No. 7,435,311, which is currently, or is an application of which a currently application is entitled to the benefit of the filing date.

The present application constitutes a continuation-in-part of U.S. patent application Ser. No. 12/009,375, entitled SUBSTRATE LAMINATION SYSTEM AND METHOD, naming Tracy J. Barnidge, Vincent P. Marzen, Paul R. Nemeth, and James D. Sampica as inventors, filed Jan. 18, 2008, now U.S. Pat. No. 8,691,043, issued Apr. 8, 2014.

The present application constitutes a continuation-in-part of U.S. patent application Ser. No. 12/009,372, entitled SYSTEM AND METHOD FOR DISASSEMBLING LAMINATED SUBSTRATES, naming Tracy J. Barnidge, Vincent P. Marzen, Paul R. Nemeth, and James D. Sampica as inventors, filed Jan. 18, 2008, now U.S. Pat. No. 8,118,075, issued Feb. 21, 2012.

The present application constitutes a continuation-in-part of U.S. patent application Ser. No. 12/009,393, entitled SYSTEM AND METHOD FOR COMPLETING LAMINATION OF RIGID-TO-RIGID SUBSTRATES BY THE CONTROLLED APPLICATION OF PRESSURE naming Tracy J. Barnidge, Vincent P. Marzen, Paul R. Nemeth, and James D. Sampica as inventors, filed Jan. 18, 2008, now U.S. Pat. No. 8,137,498, issued Mar. 20, 2012.

The present application constitutes a continuation-in-part of U.S. patent application Ser. No. 12/009,373, entitled ALIGNMENT SYSTEM AND METHOD THEREOF, naming Tracy J. Barnidge, Vincent P. Marzen, Paul R. Nemeth, and James D. Sampica as inventors, filed Jan. 18, 2008, now U.S. Pat. No. 7,814,676, issued Oct. 19, 2010.

The present application constitutes a continuation-in-part of U.S. patent application Ser. No. 12/009,472, entitled PLANARIZATION TREATMENT OF PRESSURE SENSITIVE ADHESIVE FOR RIGID-TO-RIGID SUBSTRATE LAMINATION naming Tracy J. Barnidge, Vincent P. Marzen, Paul R. Nemeth, and James D. Sampica as inventors, filed Jan. 18, 2008, now U.S. Pat. No. 8,603,288, issued Dec. 10, 2013.

All subject matter of the Related Applications and of any and all parent, grandparent, great-grandparent, etc. applications of the Related Applications is incorporated herein by reference to the extent such subject matter is not inconsistent herewith.

BACKGROUND

Liquid crystal display (LCD) screens and other monitors may require rigid or semi-rigid substrates to be coupled to the display. These substrates may serve many purposes including optical enhancements, protection from impact, or environmental concerns, or sometimes to improve thermal operating range, such as heating elements. As such, robust lamination of multiple substrates, such as a rigid glass substrate to an LCD screen, may be desirable.

SUMMARY

The present disclosure is directed to a substrate lamination system and method.

A substrate lamination apparatus may comprise: (a) a vacuum chamber; (b) a flexible membrane; and (c) a substrate support.

A system for laminating substrates may comprise: (a) a vacuum chamber; (b) a flexible membrane; (c) a substrate support; (d) a vacuum pump; (e) a compressor; and (f) a control unit, wherein the control unit is configured to carry out the steps: (i) evacuating the vacuum chamber; and (ii) applying pressure to at least one of a first substrate and a second substrate.

It is to be understood that both the foregoing general description and the following detailed description are exemplary and explanatory only and are not necessarily restrictive of the claims. The accompanying drawings, which are incorporated in and constitute a part of the specification, illustrate examples and together with the general description, serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1:
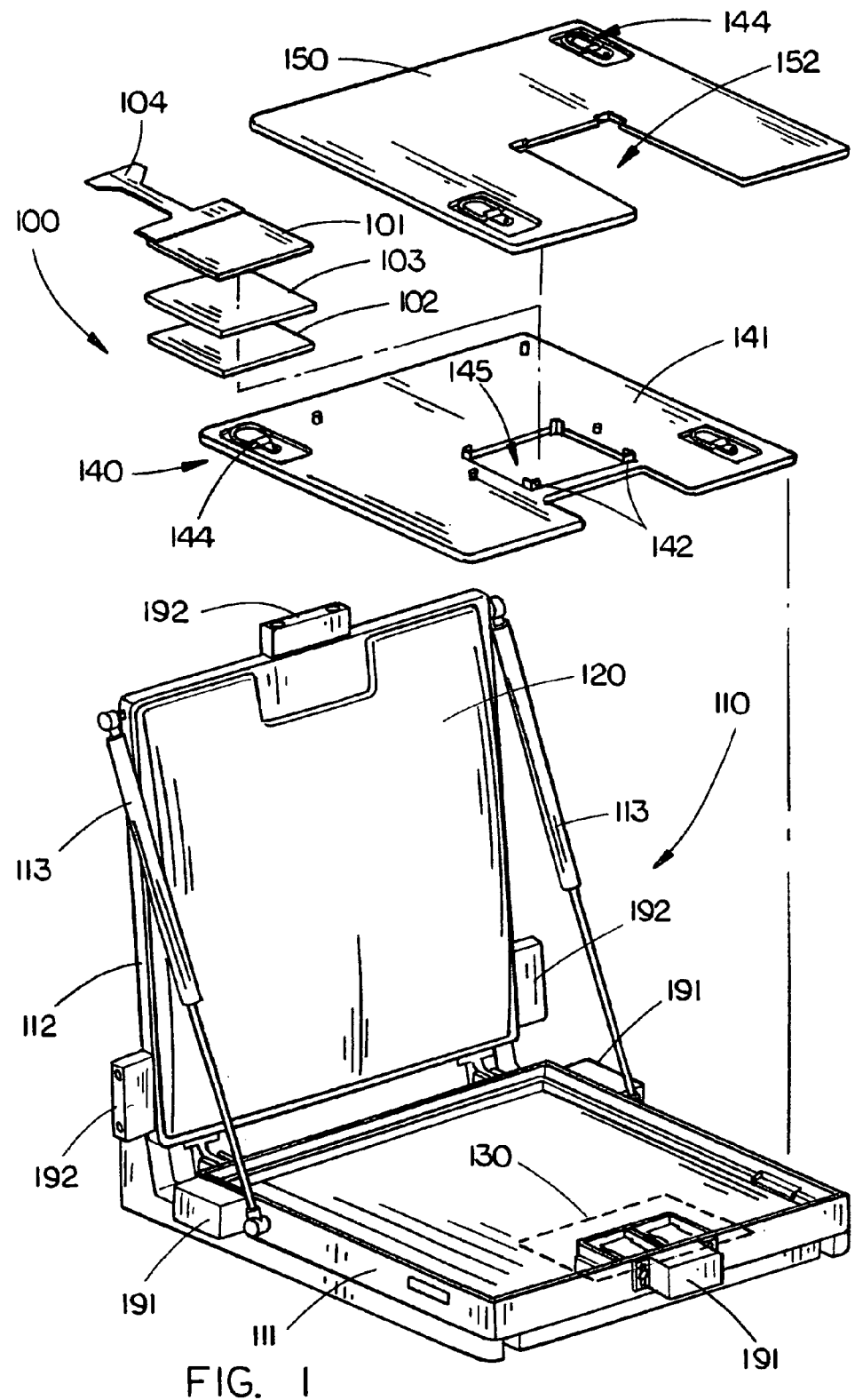
FIG. 1 is an isometric view of a substrate lamination system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 18:
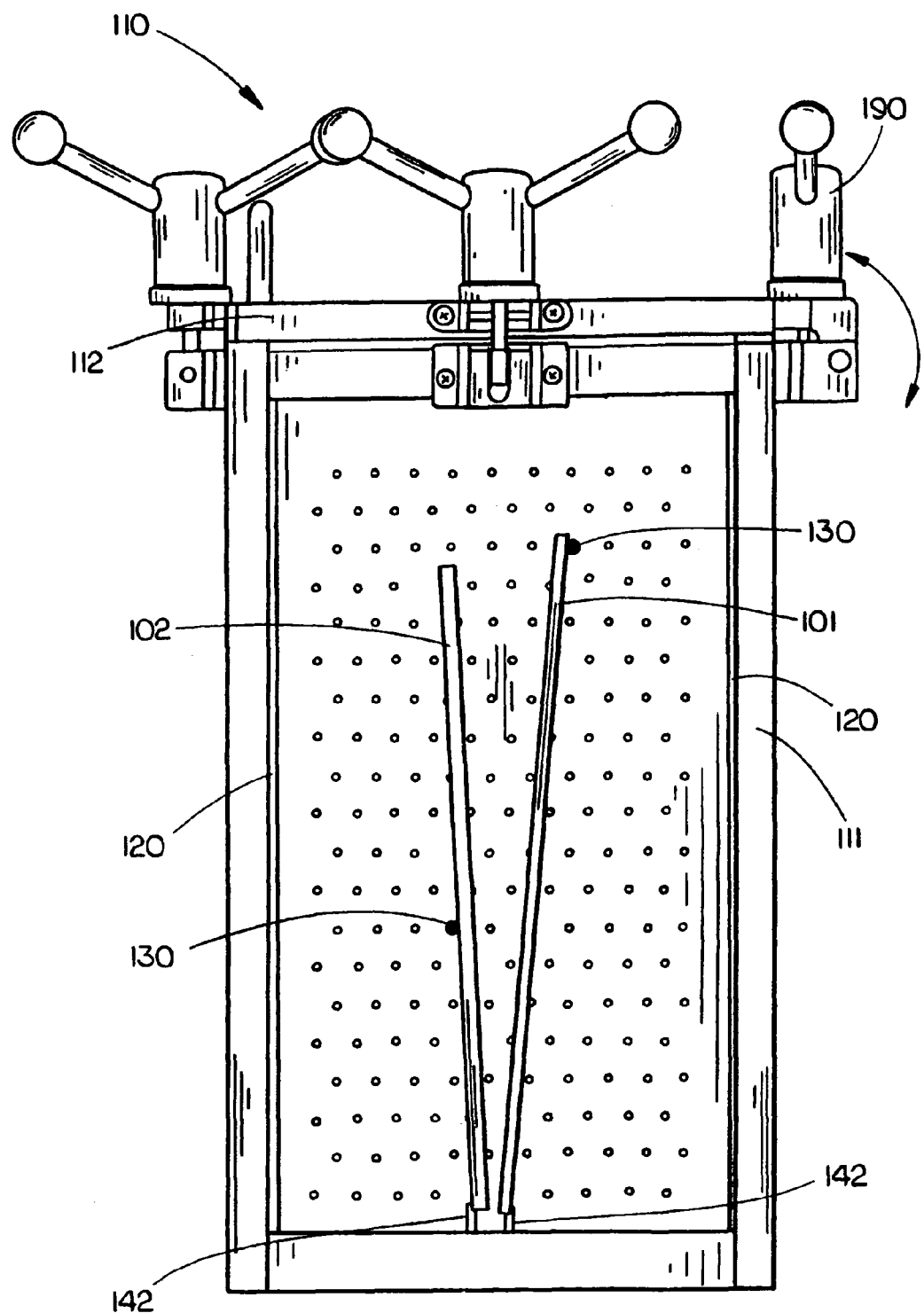
FIG. 18 is a cross-sectional view of a substrate lamination system.

FIGS. 1 and 18 illustrate example systems in which one or more technologies may be implemented. A lamination system 100 may comprise a vacuum chamber 110, at least one flexible membrane 120, and a substrate support 130.

The vacuum chamber 110 may be any container which is capable of being sealed so as to separate a space interior to the vacuum chamber 110 from a space exterior to the vacuum chamber 110. For example, the vacuum chamber 110 may be a generally rectangular structure having a vacuum chamber body 111 and a vacuum chamber lid 112. The vacuum chamber 110 may be constructed of any number of materials having sufficient strength so as to maintain a vacuum such as aluminum, steel, carbon fiber, plastics, and the like.

Figure 2:
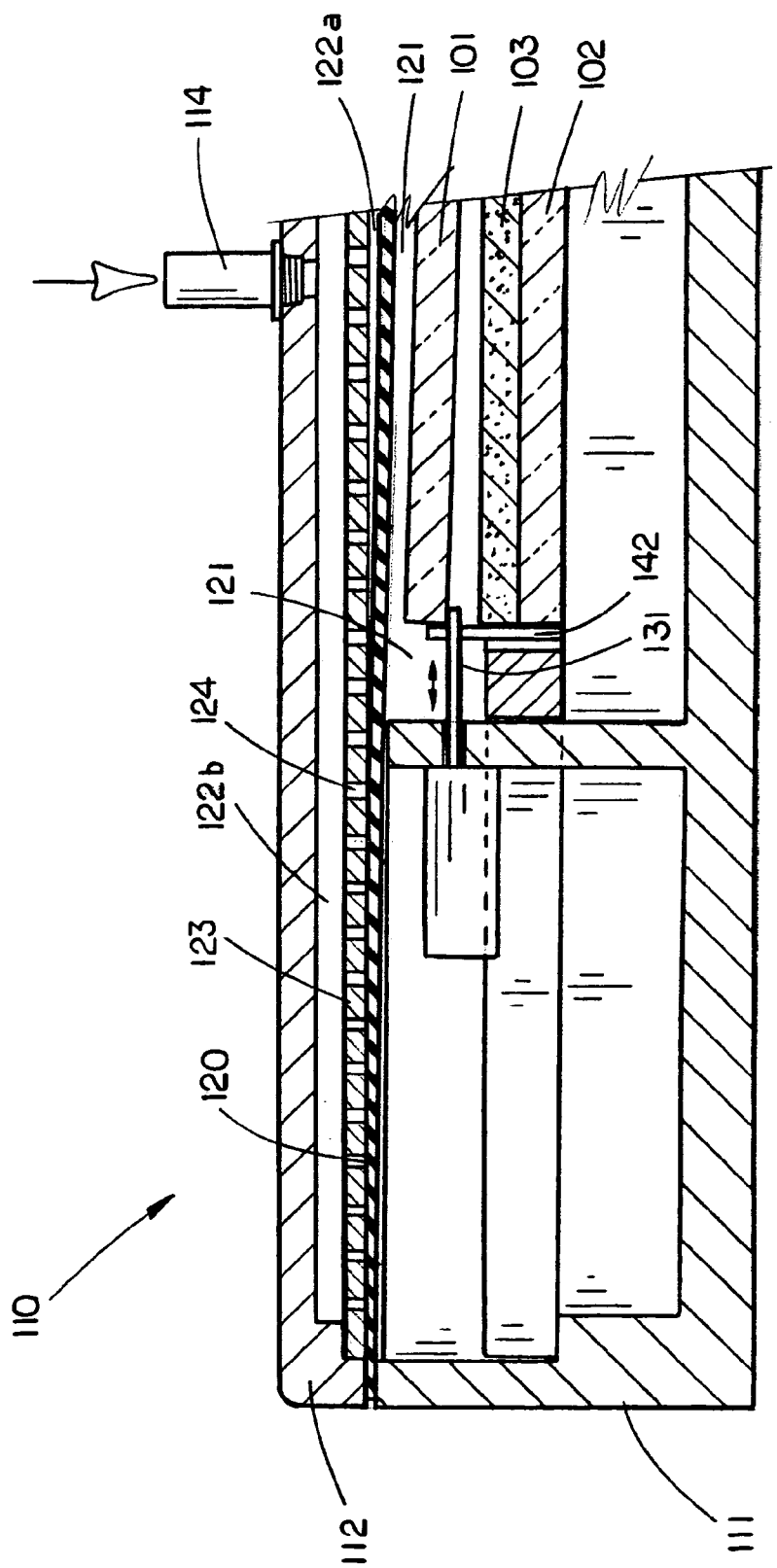
FIG. 2 is an cross-sectional view of a substrate lamination system.
Figure 3:
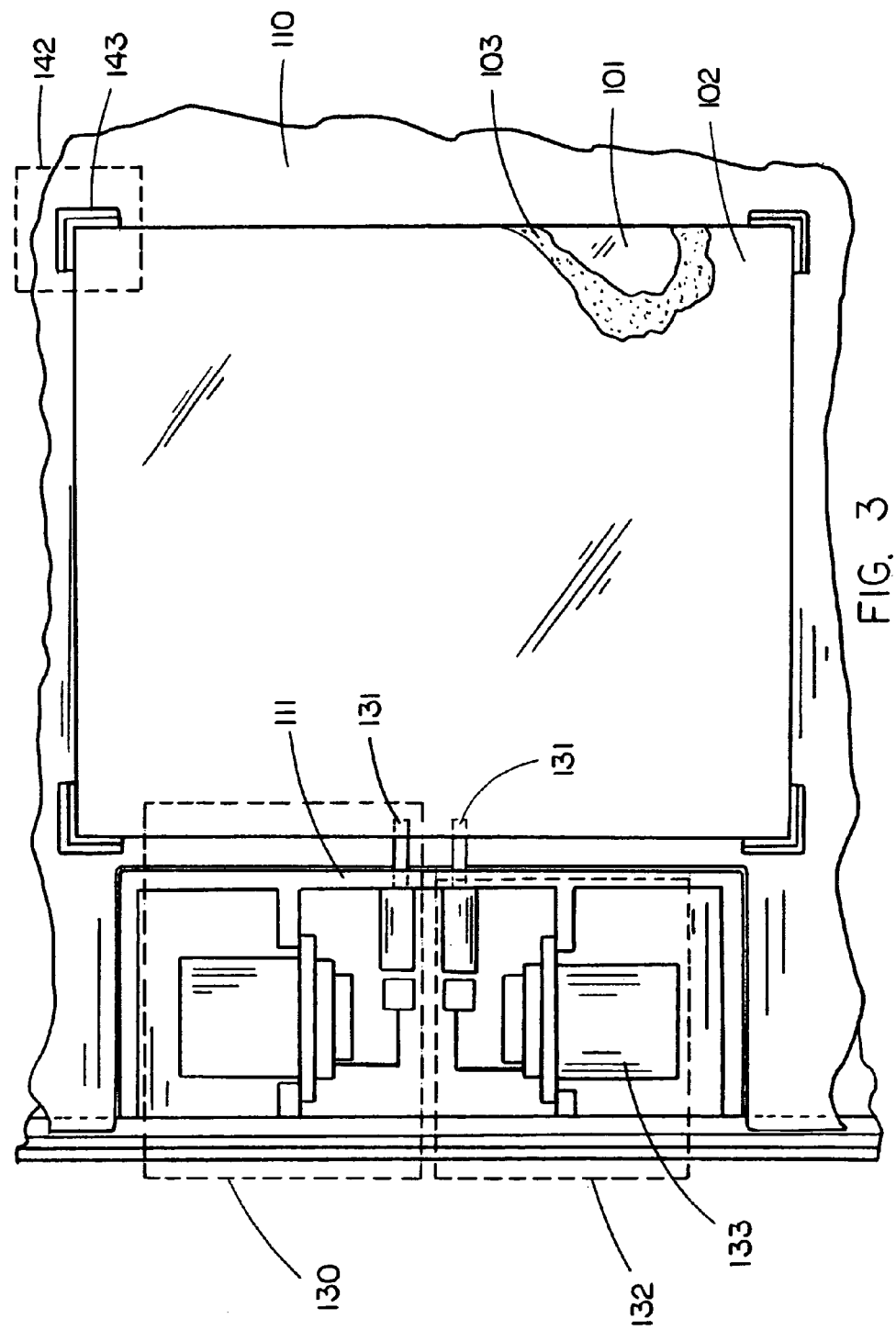
FIG. 3 top view of a substrate lamination system.

Referring now to FIG. 2, the flexible membrane 120 may be disposed within the vacuum chamber 110 so as to partition the vacuum chamber 110 into at least a first compartment 121 and a second compartment 122. For example, the flexible membrane 120 may be affixed to an underside of the vacuum chamber lid 112 by sealing the flexible membrane 120 about the periphery of the vacuum chamber lid 112 so as to partition the vacuum chamber 110 into a first compartment 121 formed by the flexible membrane 120 and the vacuum chamber body 111 and a second compartment 122 formed by the flexible membrane 120 and the vacuum chamber lid 112.

The second compartment 122 may comprise an expansion portion 122A and a plenum portion 122B separated by a perforated plenum diffuser screen 123. The perforated plenum diffuser screen 123 may serve to provide uniform distribution of airflow from the plenum portion 122B into the expansion portion 122A.

The flexible membrane 120 may be constructed from any flexible material capable of partitioning two compartments into separate pressure zones. For example, the flexible membrane 120 may be constructed of silicone rubber. The flexible membrane 120 may have one or more of the following physical characteristics: an elongation capacity of at least 100%; a tear strength of at least 30 psi; anti-static properties and/or an anti-static liner (e.g. polyester or polyethylene) disposed on one or more surfaces of the flexible membrane 120.

In other exemplary embodiments, the lamination system 100 may comprise at least one lid positioning mechanism 113. The lid positioning mechanism 113 may serve to maintain the vacuum chamber lid 112 in an open position with respect to the vacuum chamber body 111. The lid positioning mechanism 113 may comprise a gas cylinder mechanism as depicted in FIG. 1. In still further exemplary embodiments, the lid positioning mechanism 113 may comprise an actuated mechanism (e.g. a pneumatically actuated system, [not shown]) which may be extended or retracted manually or as part of an automated system controlled by a processing unit.

Referring now to FIGS. 3-18, the substrate support 130 may be any device/structure capable of maintaining a first substrate 101 and a second substrate 102 in spatial separation when disposed within the vacuum chamber 110. The substrate support 130 may maintain the first substrate 101 and/or the second substrate 102 in semi-horizontal positions as in FIG. 2 or in semi-vertical positions as in FIG. 18. For example, the substrate support 130 may comprise at least one retractable support pin 131. The retractable support pin 131 may be disposed within and project from a wall of the vacuum chamber body 111. The retractable support pin 131 may be operably coupled to an actuating mechanism 132. Further, the use of any number of substrate supports 130 supporting any number of substrates is fully contemplated by the presently described embodiments.

The cross-geometry of the tip of the retractable support pin 131 may be selected from any number of geometries including, but not limited to: cylindrical, square, hemispherical, trapezoidal, and the like. The geometry may be selected so as to minimize contact with a substrate while providing adequate substrate support.

Figure 7:
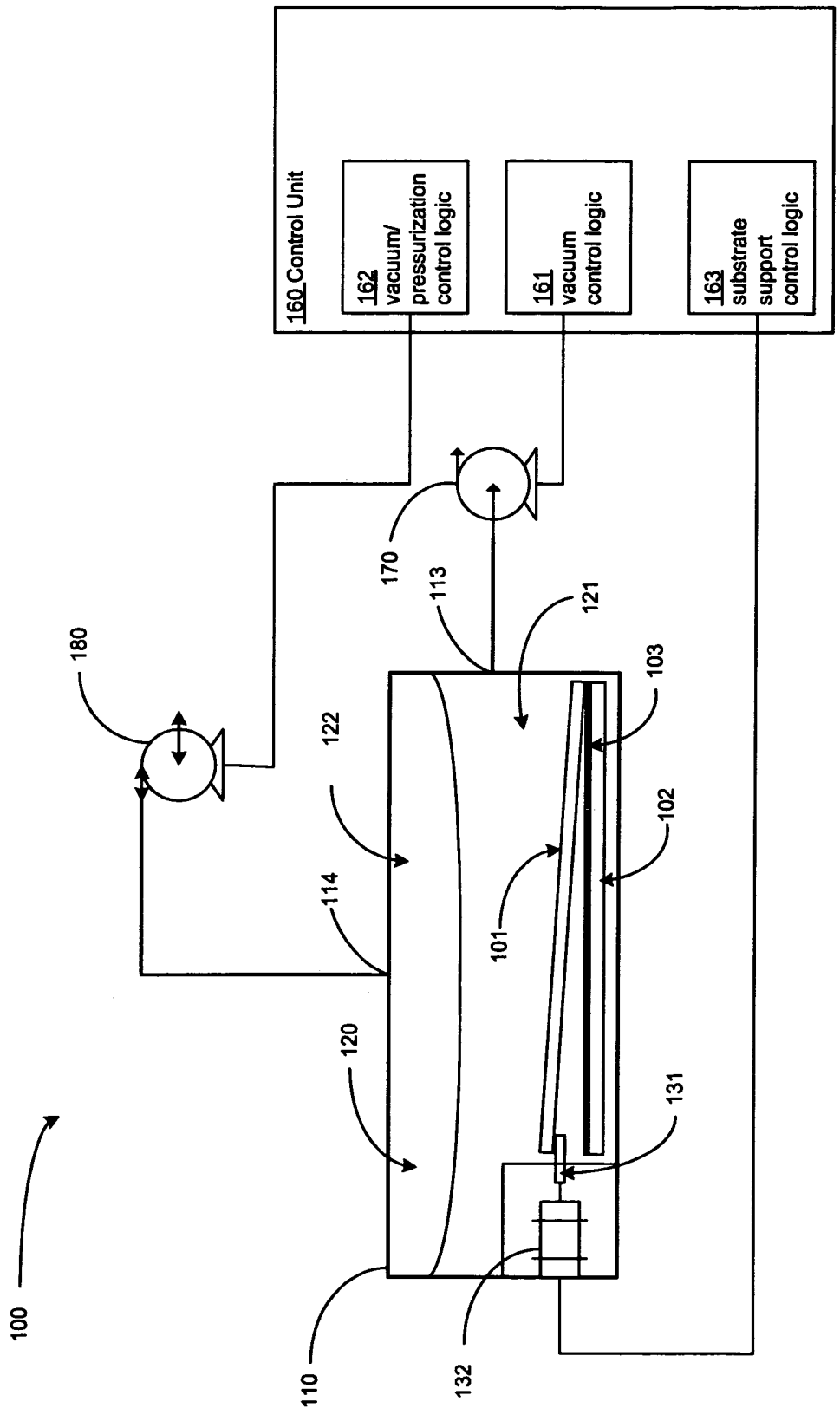
FIG. 7 an schematic view of a substrate lamination system.

The actuating mechanism 132 may comprise a motor 133 configured to translate the retractable support pin 131 in and out of the vacuum chamber 110. The operation of the motor 133 and the corresponding insertion or retraction of the retractable support pin 131 may be controlled by a control unit 160, as shown in FIG. 7.

In other exemplary embodiments, the substrate support 130 may comprise a deformable support (e.g. a foam or putty structure; a spring structure) an electromagnetic support (e.g. an electromagnet operably couplable to a metallic element), retractable air cylinder or solenoid.

The first substrate 101 and/or second substrate 102 may be rigid or semi-rigid in nature such that, when supported by the substrate support 130, the first substrate 101 and/or second substrate 102 do not deform to a degree such that they contact a layer disposed in a horizontal plane beneath the first substrate 101 and/or second substrate 102, such as a pressure-sensitive adhesive layer 103. For example, the first substrate 101 may comprise a display monitor (e.g. an LCD, LCOS, or LED screen). The second substrate 102 may comprise an opaque rigid or semi-rigid reinforcing layer (e.g. glass, plastic). The pressure-sensitive adhesive layer 103 may comprise commonly known acrylic or silicone based polymers.

Figure 4:
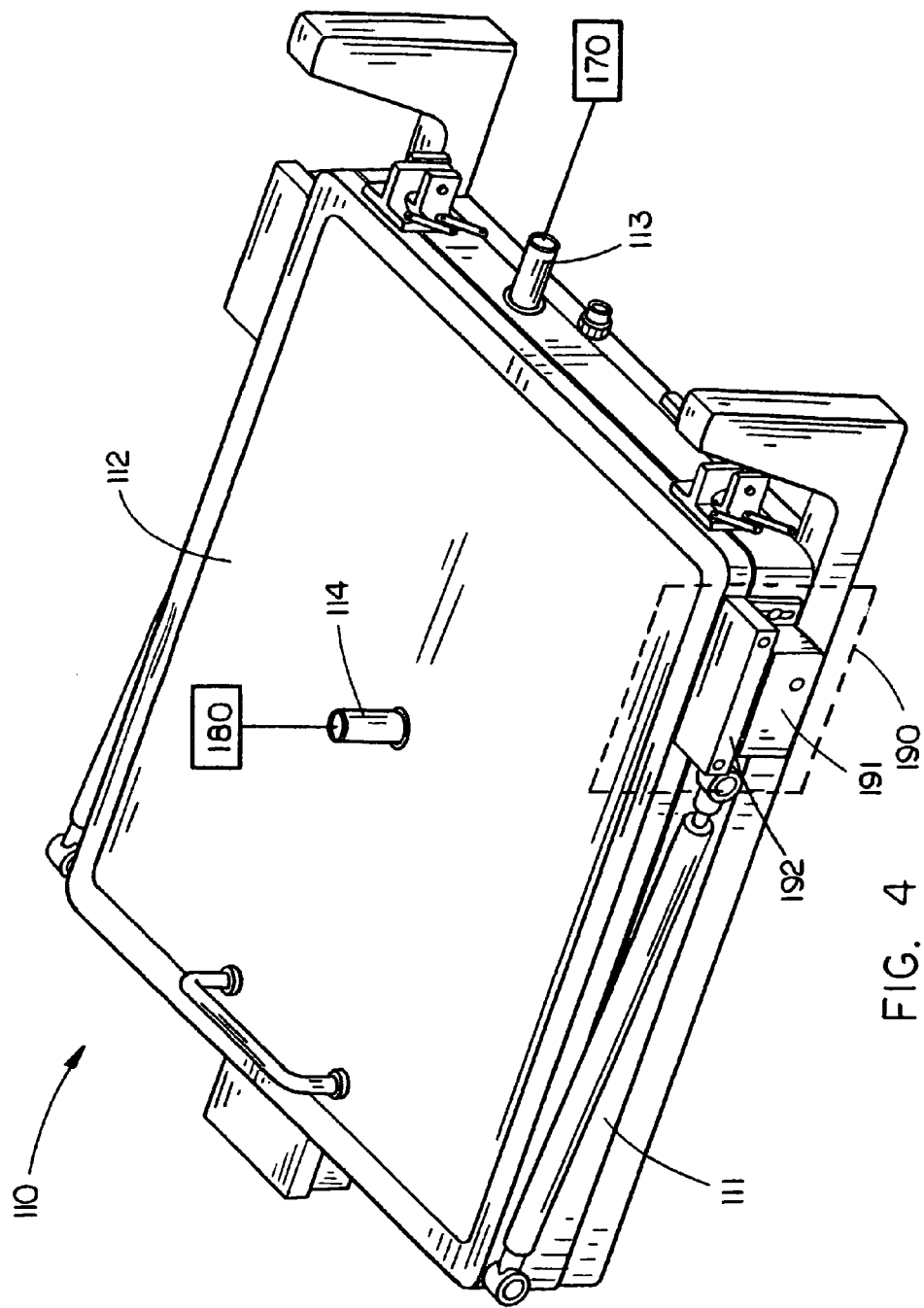
FIG. 4 is an isometric view of a substrate lamination system.
Figure 5:
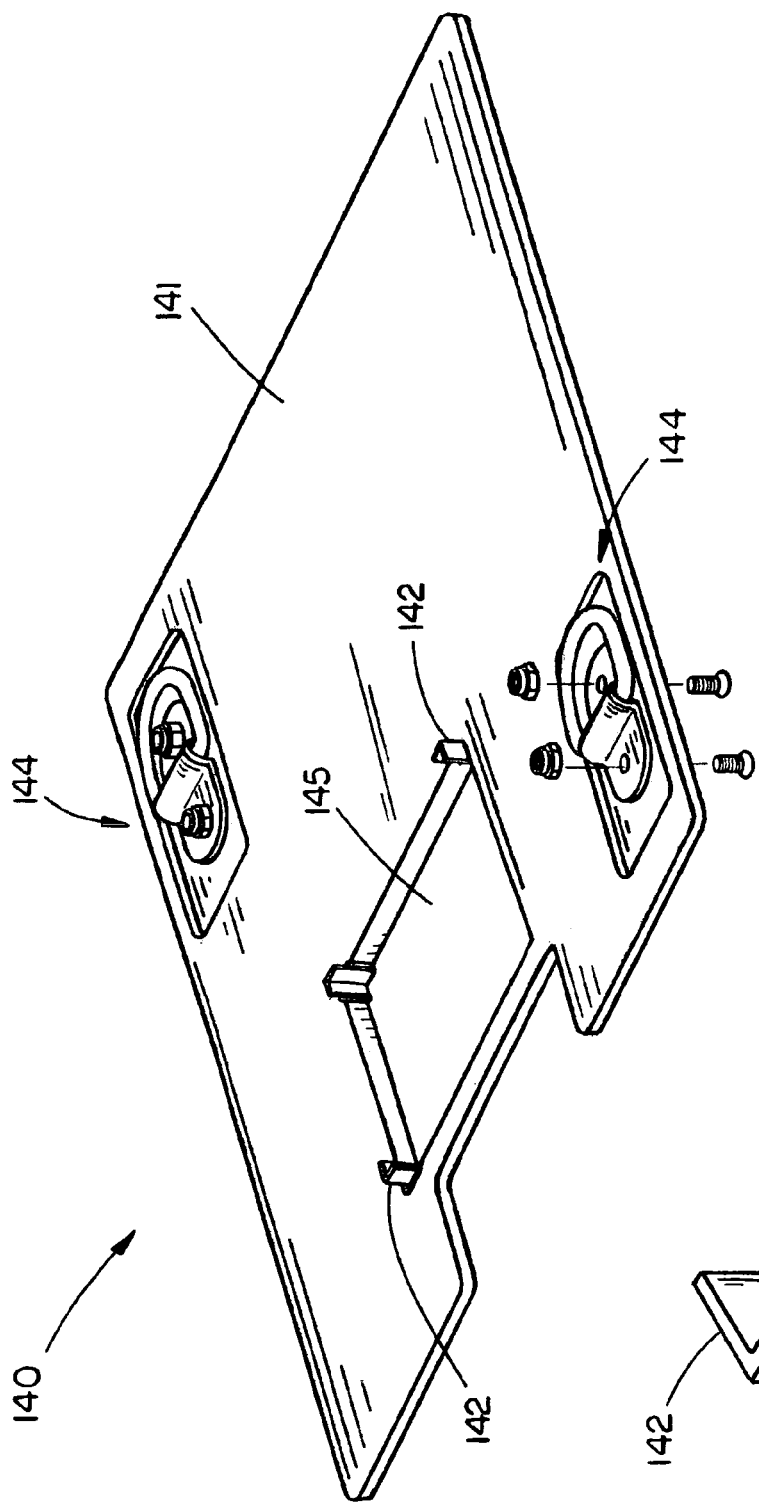
FIG. 5 is an isometric view of a substrate alignment insert.

Referring to FIG. 4, the vacuum chamber 110 may further comprise a vacuum port 113 so as to provide a connection for a vacuum line (not shown) operably coupled to a vacuum pump 170. The vacuum port 113 may be operably coupled to the vacuum chamber body 111 to provide a conduit between the first compartment 121 and the vacuum pump 170.

The vacuum chamber 110 may further comprise a vacuum/pressurization port 114 so as to provide a connection for a vacuum/compressor line (not shown) operably coupled to a vacuum pump/compressor 180. The vacuum/pressurization port 114 may be operably coupled to the vacuum chamber lid 112 to provide a conduit between the second compartment 122 and the vacuum pump/compressor 180.

In still another exemplary embodiment, the lamination system 100 may comprise at least one locking mechanism 190. The locking mechanism 190 may serve to secure the vacuum chamber lid 112 to the vacuum chamber body 111 so that the interior of the vacuum chamber 110 may be evacuated. For example, locking mechanism 190 may comprise an electromagnetic lock having an electromagnet 191 and a metal element 192 operably couplable to the electromagnet so as to maintain the vacuum chamber lid 112 and the vacuum chamber body 111 in a locked position, thereby creating an adequate seal via the flexible membrane 120.

Referring again to FIG. 5, the lamination system 100 may further comprise a substrate alignment insert 140. The substrate alignment insert 140 may serve to align at least one the first substrate 101 and the second substrate 102 within the vacuum chamber 110. The substrate alignment insert 140 may comprise a base portion 141 (e.g. the floor of the vacuum chamber body 111 or a separate base layer) and at least one substrate alignment guide 142. For example, the substrate alignment guide 142 may comprise two substantially adjacent wall portions configured at a 90° angle with respect to one another and projecting from the base portion 141 so as to receive at least one substrate within the space defined by the angle of the wall portions.

In alternate exemplary embodiments, the substrate alignment guide 142 may be selected from brackets, pegs, grooves, bumps, slots, a recessed space within a body, and/or any other suitable mechanism for specifically positioning a substrate within the vacuum chamber 110.

In an alternate exemplary embodiment, the base portion 141 of the substrate alignment insert 140 may further comprise a recessed region 145 suitable for receiving at least one of the first substrate 101 and the second substrate 102.

Figure 6:
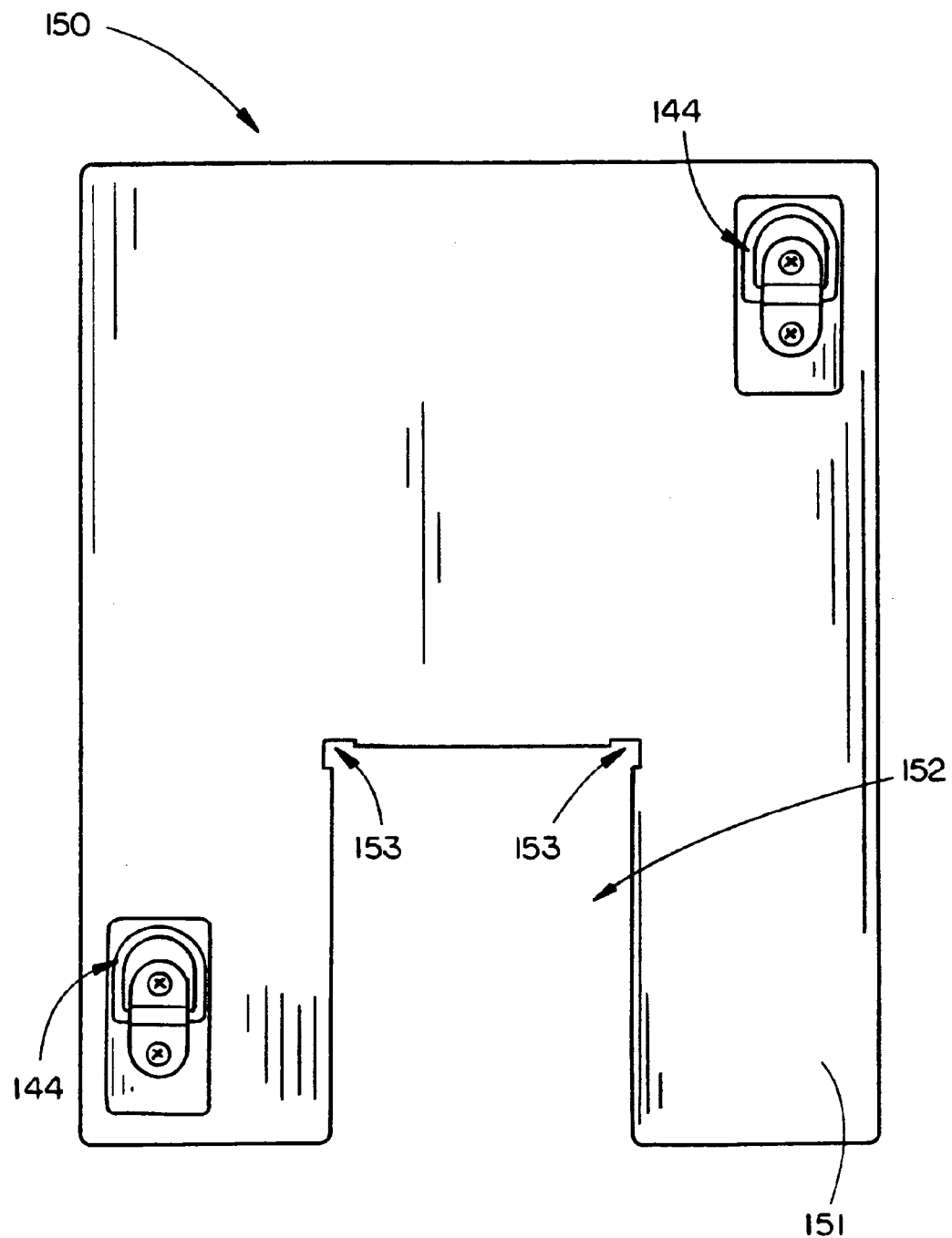
FIG. 6 is a top view of a substrate mask.

Referring to FIG. 6, the lamination system 100 may further comprise a carriage or substrate mask 150. The substrate mask 150 may comprise a substantially planar mask body 151 defining a mask aperture 152. The mask aperture 152 may be configured so as to fit around at least one substrate alignment guide 142. For example, the mask aperture 152 may comprise alignment guide aperture portions 153 may be which allow the substrate mask 150 to be secured around at least one substrate alignment guide 142. The substrate mask 150 may serve to protect portions of or the second substrate 102 which are outside the periphery of the mask aperture 152, such as flexible circuitry 104 coupled to the first substrate 101.

Referring again to FIG. 5, in an alternate exemplary embodiment, the at least one substrate alignment guide 142 may comprise a substrate mask support portion 143. The substrate mask support portion 143 may allow the substrate alignment guide 142 to support the substrate mask 150 in a spatial separation from the base portion 141 when the substrate mask 150 is disposed atop the substrate alignment insert 140.

In still another exemplary embodiment, the substrate alignment insert 140 and/or the substrate mask 150 may be removable from the lamination system 100 so as to allow for the lamination of different sizes of substrates. To effectuate the removal of the substrate alignment insert 140 and/or the substrate mask 150, at least one handle member 144 may be provided.

In still further exemplary embodiments, lamination system 100 components may incorporate electrostatic discharge (ESD) prevention technologies. For example, the substrate alignment insert 140 and/or the substrate mask 150 may be constructed from materials having desirable ESD properties. Further, the substrate alignment insert 140, the substrate mask 150 and/or any other lamination system 100 component may be connected to electrical ground via ground lines. Further, the lamination system 100 components may be subjected to ionization such that charged surfaces will dissipate that charge through controlled methods. Such ionization may be conducted prior to bringing sensitive substrates, such as sensitive electronic substrates into close proximity with the lamination system 100.

Referring to FIG. 7, the lamination system 100 may further comprise a control unit 160. The control unit 160 unit may comprise vacuum control logic 161, vacuum/pressurization control logic 162 and/or substrate support control logic 163. The vacuum control logic 161, vacuum/pressurization control logic 162, and/or substrate support control logic 163 may comprise integrated logic (e.g. application specific integrated circuitry (ASIC), field programmable gate arrays (FPGA), digital signal processors (DSP)), a programmable logic controller (PLC) or one or more programs (e.g. firmware or software) configured to run on one or more processors (e.g. processors marketed by Intel® and AMD® integrated into personal computers (PCs)).

The vacuum control logic 161 may be configured to provide control signals to a vacuum pump 170 operably coupled to the vacuum chamber 110 via vacuum port 113 to create a vacuum within the first compartment 121.

The vacuum/pressurization control logic 162 may be configured to provide control signals to vacuum pump/compressor 180 operably coupled to the vacuum chamber 110 via vacuum/pressurization port 114 to create a vacuum or pressurization within the second compartment 122.

The substrate support control logic 163 may be configured to provide control signals to the actuating mechanism 132 to either insert or retract the retractable support pin 131.

Figure 8:
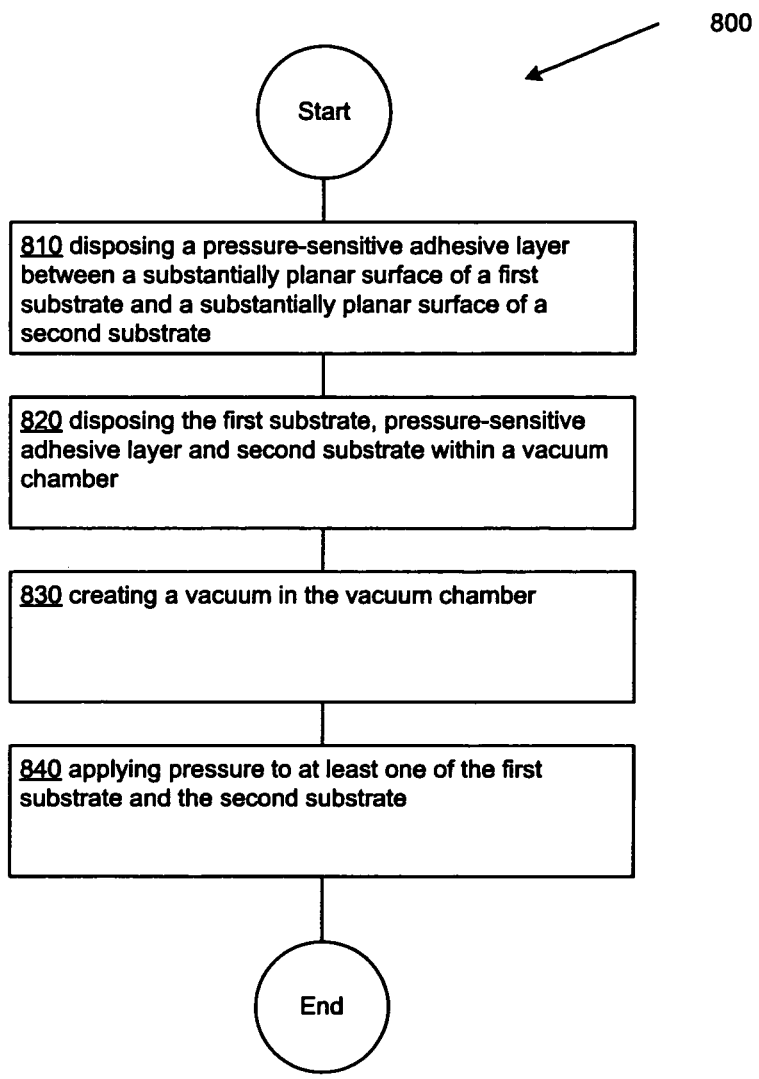
FIG. 8 is a high-level logic flowchart of a process.

FIG. 8 illustrates an operational flow 800 representing example operations related to lamination of one or more substrates with a pressure sensitive adhesive. In FIG. 8 and in following figures that include various examples of operational flows, discussion and explanation may be provided with respect to the above-described examples of FIGS. 1 through 7, and/or with respect to other examples and contexts. However, it should be understood that the operational flows may be executed in a number of other environments and contexts, and/or in modified versions of FIGS. 1 through 7. Also, although the various operational flows are presented in the sequence(s) illustrated, it should be understood that the various operations may be performed in other orders than those which are illustrated, or may be performed concurrently.

After a start operation, the operational flow 800 moves to a disposing operation 810, where disposing a pressure-sensitive adhesive layer between a substantially planar surface of a first substrate and a substantially planar surface of a second substrate may occur. For example, as shown in FIGS. 1 through 7, the pressure-sensitive adhesive layer 103 may be disposed between the first substrate 101 and the second substrate 102. Disposing operation 810 may be conducted in either a manual fashion (e.g. by an operator) or an automated fashion whereby an automated disposing apparatus (e.g. a robotic arm configured to dispose the pressure-sensitive adhesive layer 103 between the first substrate 101 and the second substrate 102) such as those commonly found in the manufacturing arts may be employed.

Then, in a disposing operation 820, disposing the first substrate, pressure-sensitive adhesive layer and second substrate within a vacuum chamber may occur. For example, as shown in FIGS. 1 through 7, the first substrate 101, the second substrate 102, and the pressure-sensitive adhesive layer 103 may be disposed within the vacuum chamber 110. Disposing operation 820 may be conducted in either a manual fashion (e.g. by an operator) or an automated fashion whereby an automated disposing apparatus (e.g. a robot arm configured to dispose the pressure-sensitive adhesive layer 103 between the first substrate 101 and the second substrate 102) such as those commonly found in the manufacturing arts may be employed.

Then, in an evacuation operation 830, evacuating the vacuum chamber may occur. For example, as shown in FIGS. 1 through 7, the vacuum control logic 161 may cause the vacuum pump 170 to evacuate the first compartment 121 of the vacuum chamber 110 via vacuum port 113. During vacuum operation 830, the vacuum/pressurization port 114 or the inlet of the vacuum pump/compressor 180 may be sealed so as to limit any deformation of the flexible membrane 120 during the evacuation of the vacuum chamber 110.

Then, in a pressure application operation 840, applying pressure to at least one of a first substrate and a second substrate may occur. For example, as shown in FIGS. 1 through 7, the vacuum/pressurization control logic 162 may cause the vacuum pump/compressor 180 to pressurize the second compartment 122 of the vacuum chamber 110 via vacuum/pressurization port 114. The pressurization of the second compartment 122 may induce a deformation of the flexible membrane 120 in at least the general direction of the first substrate 101, the second substrate 102, and the pressure-sensitive adhesive layer 103. Such a deformation may press the first substrate 101, the second substrate 102, and the pressure-sensitive adhesive layer 103 together, thereby attaching the pressure-sensitive adhesive layer 103 so as to laminate the first substrate 101 and the second substrate 102 to one another.

In other exemplary embodiments, the flexible membrane 120 may comprise a vacuum bag (not shown) which may be disposed within the vacuum chamber 110, there by defining the first compartment 121 inside the vacuum bag and the second compartment 122 outside the bag. The vacuum bag may at least substantially surround the first substrate 101, the second substrate 102, and the pressure-sensitive adhesive layer 103 within the first compartment 121.

Figure 9:
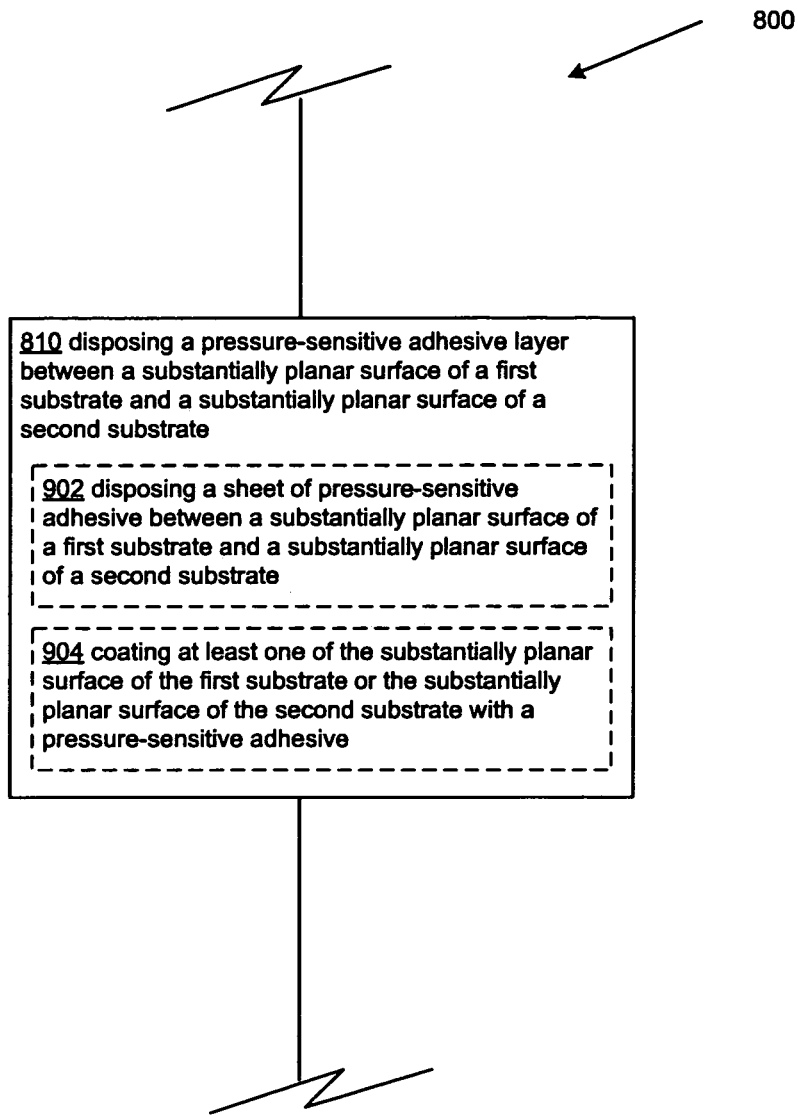
FIG. 9 is a high-level logic flowchart of a process depicting alternate implementations of FIG. 8.

FIG. 9 illustrates alternative embodiments of the example operational flow 800 of FIG. 8. FIG. 9 illustrates example embodiments where the disposing operation 810 may include at least one additional operation. Additional operations may include an operation 902, and/or an operation 904.

At the operation 902, disposing a sheet of pressure-sensitive adhesive between a substantially planar surface of a first substrate and a substantially planar surface of a second substrate may occur. For example, as shown in FIGS. 1 through 7, the pressure-sensitive adhesive layer 103 may be a preformed adhesive sheet which may be mechanically disposed between the first substrate 101 and the second substrate 102.

At the operation 904, coating at least a portion of at least one of the substantially planar surface of the first substrate and the substantially planar surface of the second substrate with a pressure-sensitive adhesive may occur. For example, as shown in FIGS. 1 through 7, the pressure-sensitive adhesive layer 103 may be a cured-state polymer-based pressure sensitive adhesive composition which may be coated on a surface of at least one of the first substrate 101 and the second substrate 102.

Figure 10:
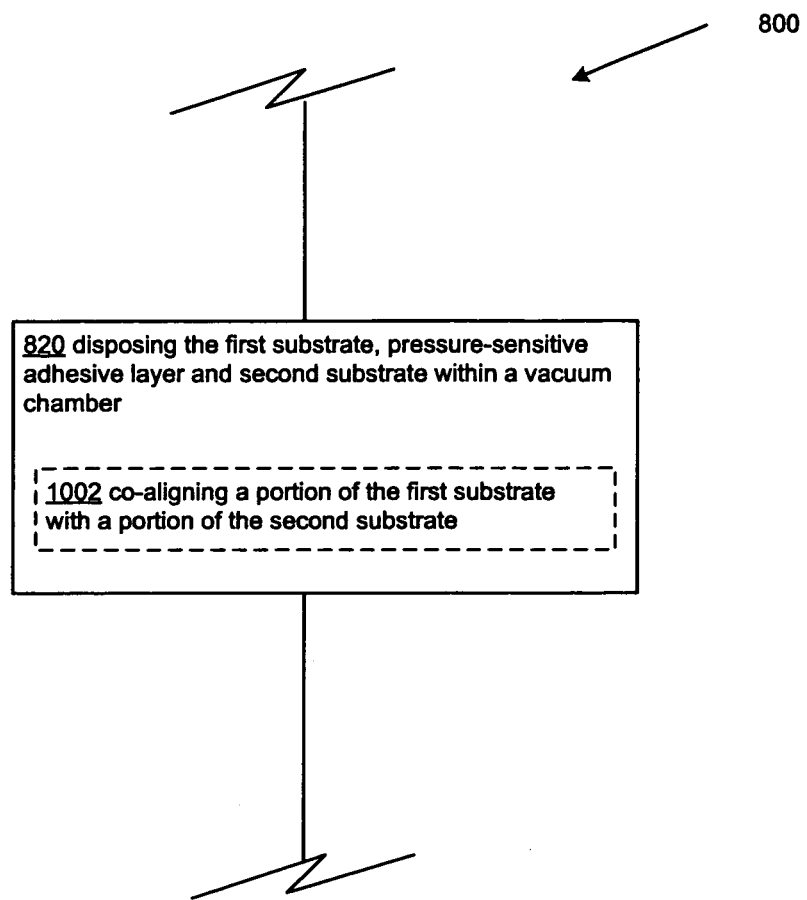
FIG. 10 is a high-level logic flowchart of a process depicting alternate implementations of FIG. 8.

FIG. 10 illustrates alternative embodiments of the example operational flow 800 of FIG. 8. FIG. 10 illustrates example embodiments where the disposing operation 820 may include at least one additional operation. Additional operations may include an operation 1002.

At the operation 1002, co-aligning a portion of the first substrate with a portion of the second substrate may occur. For example, as shown in FIGS. 1 through 7, the at least one of the first substrate 101 and the second substrate 102 may be placed within the substrate alignment insert 140 so as to maintain the substrate in a substantially static position during the vacuum creation operation 830 or the pressure application operation 840. Such alignment may ensure that desired portions of at least one of the first substrate 101 and the second substrate 102 are contacted with the pressure-sensitive adhesive layer 103 while minimizing contact with undesired portions of the first substrate 101 and/or the second substrate 102.

Figure 11:
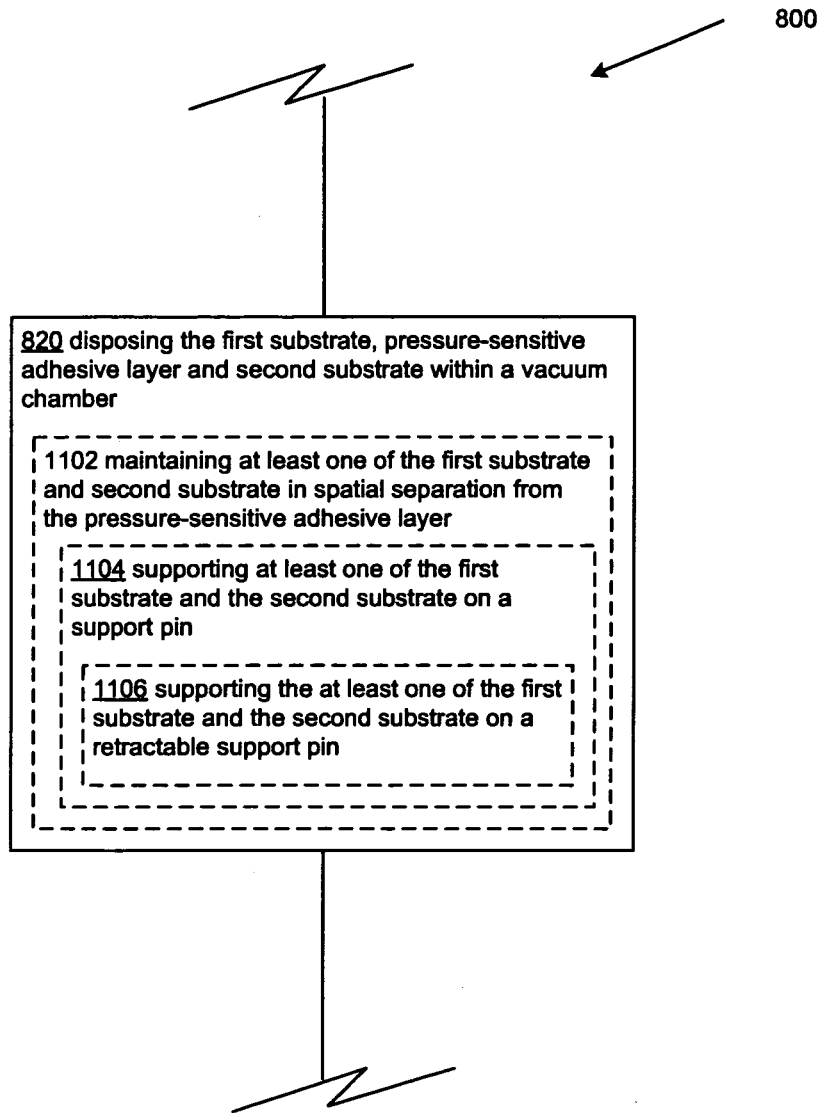
FIG. 11 is a high-level logic flowchart of a process depicting alternate implementations of FIG. 8.

FIG. 11 illustrates alternative embodiments of the example operational flow 800 of FIG. 8. FIG. 11 illustrates example embodiments where the disposing operation 820 may include at least one additional operation. Additional operations may include an operation 1102, an operation 1104, and/or an operation 1106.

At the operation 1102, maintaining at least a portion of at least one of the first substrate and second substrate in spatial separation from the pressure-sensitive adhesive layer may occur. For example, as shown in FIGS. 1 through 7, during the vacuum creation operation 830, portions of at least one of the first substrate 101 and the second substrate 102 are maintained in spatial separation from the pressure-sensitive adhesive layer 103 by the substrate support 130 so as to allow for a substantially complete evacuation of air between the substrate and the pressure-sensitive adhesive, thereby limiting the entrainment of air between the first substrate 101 and the second substrate 102. Further, at the operations 1104 and 1106, supporting at least one of the first substrate and the second substrate on a support pin may occur. For example, as shown in FIGS. 1 through 7, a retractable support pin 131 may maintain at least one of the first substrate 101 and the second substrate 102 in spatial separation from the pressure-sensitive adhesive layer 103.

Figure 12:
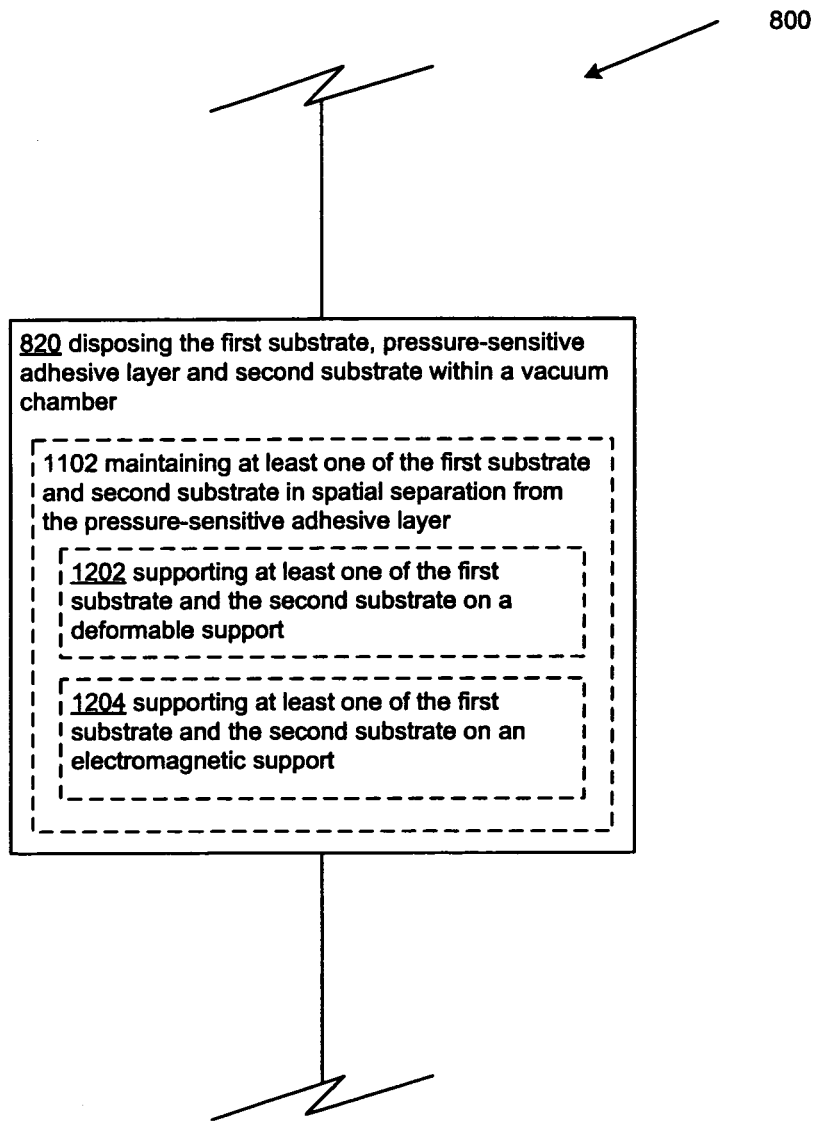
FIG. 12 is a high-level logic flowchart of a process depicting alternate implementations of FIG. 8.

FIG. 12 illustrates alternative embodiments of the example operational flow 800 of FIG. 8. FIG. 12 illustrates example embodiments where the disposing operation 820 may include at least one additional operation. Additional operations may include an operation 1202, and/or an operation 1204. Further, at the operation 1202, supporting at least one of the first substrate and the second substrate a deformable support may occur. For example, as shown in FIGS. 1 through 7, the substrate support 130 may include a deformable support such as a foam, putty structure or a spring having sufficient spring forces such that the substrate support 130 remains in an expanded configuration until a pressure is applied to at least one of the first substrate 101 and the second substrate 102, such as by the expansion of the flexible membrane 120. Further, at the operation 1204, supporting at least one of the first substrate and the second substrate on at least one electromagnetic support may occur. For example, as shown in FIGS. 1 through 7, the at least one of the first substrate 101 and the second substrate 102 may be operably coupled to a metal element which may be contacted to an electromagnet disposed within the vacuum chamber 110, such as to the vacuum chamber lid 112. Upon the application of power to the electromagnet, the metal element operably coupled to the at least one of the first substrate 101 and the second substrate 102 may be magnetically attracted to the electromagnet, thereby supporting the at least one of the first substrate 101 and the second substrate 102 is spatial separation from the pressure-sensitive adhesive layer 103.

Figure 13:
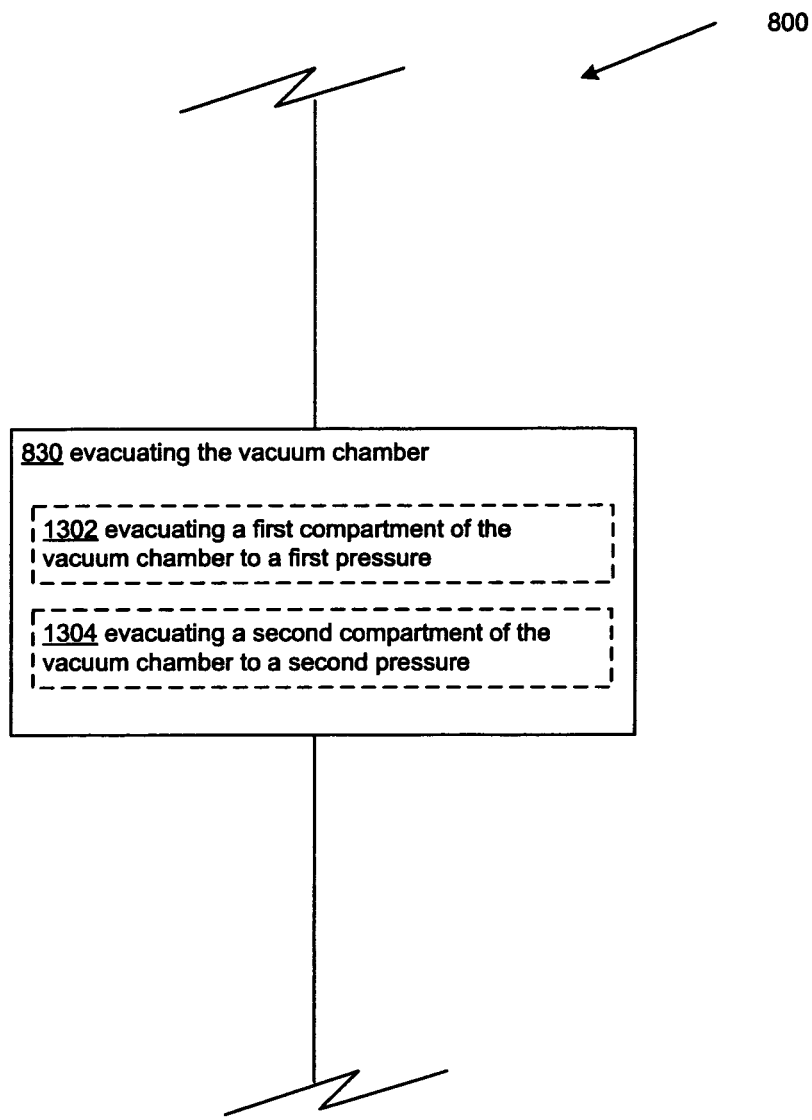
FIG. 13 is a high-level logic flowchart of a process depicting alternate implementations of FIG. 8.

FIG. 13 illustrates alternative embodiments of the example operational flow 800 of FIG. 8. FIG. 13 illustrates example embodiments where the evacuation operation 830 may include at least one additional operation. Additional operations may include an operation 1302, and/or an operation 1304.

At the operation 1302, evacuating a first portion of the vacuum chamber to a first pressure may occur. For example, as shown in FIGS. 1-7, the second compartment 122 may be evacuated via vacuum/pressurization port 114. The evacuation of the second compartment 122 may occur prior to closing the vacuum chamber lid 112 atop the vacuum chamber body 111 so as to maintain the flexible membrane 120 in close proximity to the vacuum chamber lid 112 and avoid contact between the flexible membrane 120 and at least one of the first substrate 101 and the second substrate 102 prior to pressure application operation 840.

At the operation 1304, evacuating a second portion of the vacuum chamber to a second pressure may occur. For example, as shown in FIGS. 1-7, the first compartment 121 may be evacuated via vacuum port 113. The evacuation of the first compartment 121 may occur after closing the vacuum chamber lid 112 atop the vacuum chamber body 111 so as to remove substantially all air from the interior of the first compartment 121. During evacuation operation 1304, a pressure differential may be maintained between the first compartment 121 and the second compartment 122 where the first pressure in the second compartment 122 is lower than the second pressure than the first compartment 121.

During evacuation operation 1304, a pressure differential may be maintained between the first compartment 121 and the second compartment 122 where the first pressure in the second compartment 122 is lower than the second pressure than the first compartment 121.

Figure 14:
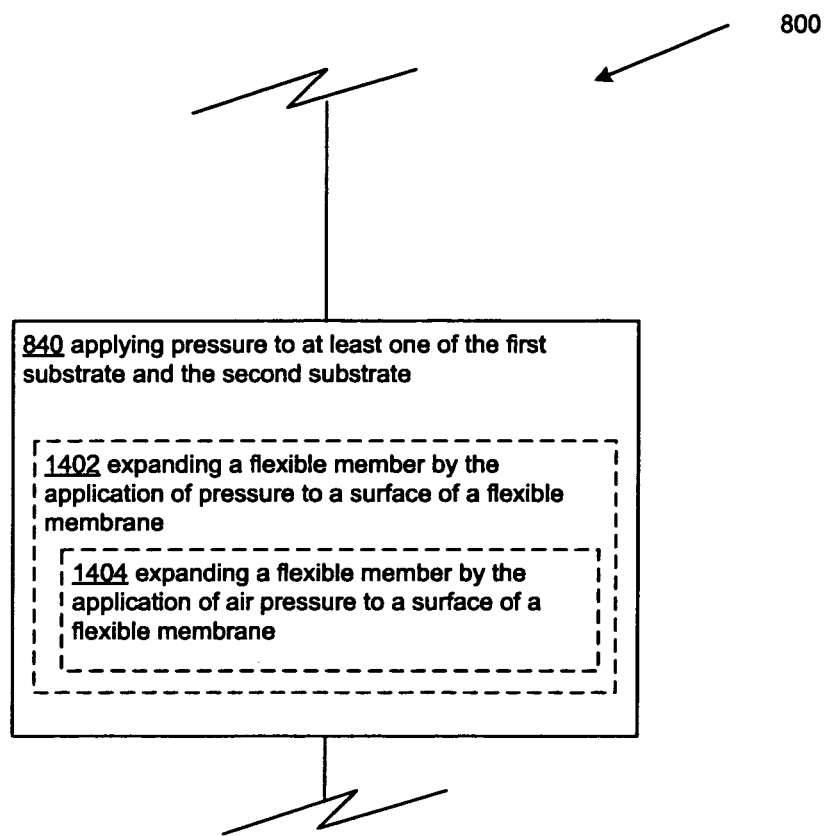
FIG. 14 is a high-level logic flowchart of a process depicting alternate implementations of FIG. 8.

FIG. 14 illustrates alternative embodiments of the example operational flow 800 of FIG. 8. FIG. 14 illustrates example embodiments where the pressure application operation 840 may include at least one additional operation. Additional operations may include an operation 1402, and/or an operation 1404.

At the operation 1402, expanding a flexible membrane by the application of pressure to a surface of the flexible membrane may occur. For example, as shown in FIGS. 1 through 7, a pressure may be exerted on the surface of the flexible membrane 120 facing the second compartment 122. Further, at the operation 1404, expanding a flexible membrane by the application of air pressure to a surface of the flexible membrane may occur. For example, as shown in FIGS. 1 through 7, the vacuum/pressurization control logic 162 of the control unit 160 may cause the vacuum pump/compressor 180 to pressurize the second compartment 122 of the vacuum chamber 110 via the vacuum/pressurization port 114. Pressurization of the second compartment 122 may cause the flexible membrane 120 to expand, thereby contacting at least one of the first substrate 101 and the second substrate 102 and pressing the first substrate 101, the pressure-sensitive adhesive layer 103 and the second substrate 102 together to attach to the pressure-sensitive adhesive layer 103 and laminate the first substrate 101 to the second substrate 102.

In particular applications, a differential pressure between an evacuated first compartment 121 and a pressurized second compartment 122 of from about 20 to 7600 torr and, more particularly, about 760 torr may be desirable. However, the amount of pressure applied to the second compartment 122 and the corresponding expansion of the flexible membrane 120 may be a function of the pressure required to effectively attach a selected pressure-sensitive adhesive layer 103 or the sensitivity of the first substrate 101 and the second substrate 102, as would be determinable by one of skill in the art. As such, any range of differential pressures between the first compartment 121 and the second compartment 122 is fully contemplated by this disclosure.

Figure 15:
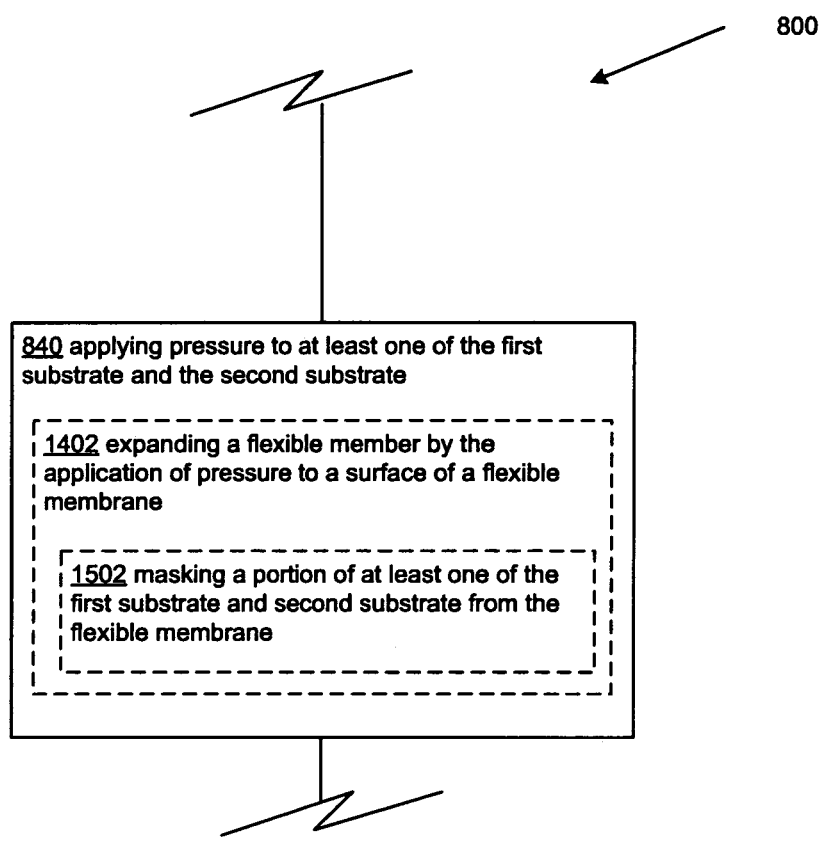
FIG. 15 is a high-level logic flowchart of a process depicting alternate implementations of FIG. 8.

FIG. 15 illustrates alternative embodiments of the example operational flow 800 of FIG. 8. FIG. 15 illustrates example embodiments where the pressure application operation 840 may include at least one additional operation. Additional operations may include an operation 1502. Further, at the operation 1502, masking a portion of at least one of the first substrate and second substrate from contact with the flexible membrane may occur. For example, as shown in FIGS. 1 through 7, the substrate mask 150 may be affixed to the substrate alignment insert 140 such that it provides a barrier between the flexible membrane 120 and at least one of the first substrate 101 and the second substrate 102. Such a configuration may limit the contact area of the flexible membrane 120 to particular portions of at least one of the first substrate 101 and the second substrate 102 within the area defined by the mask aperture 152 during flexible membrane 120 expansion.

Figure 16:
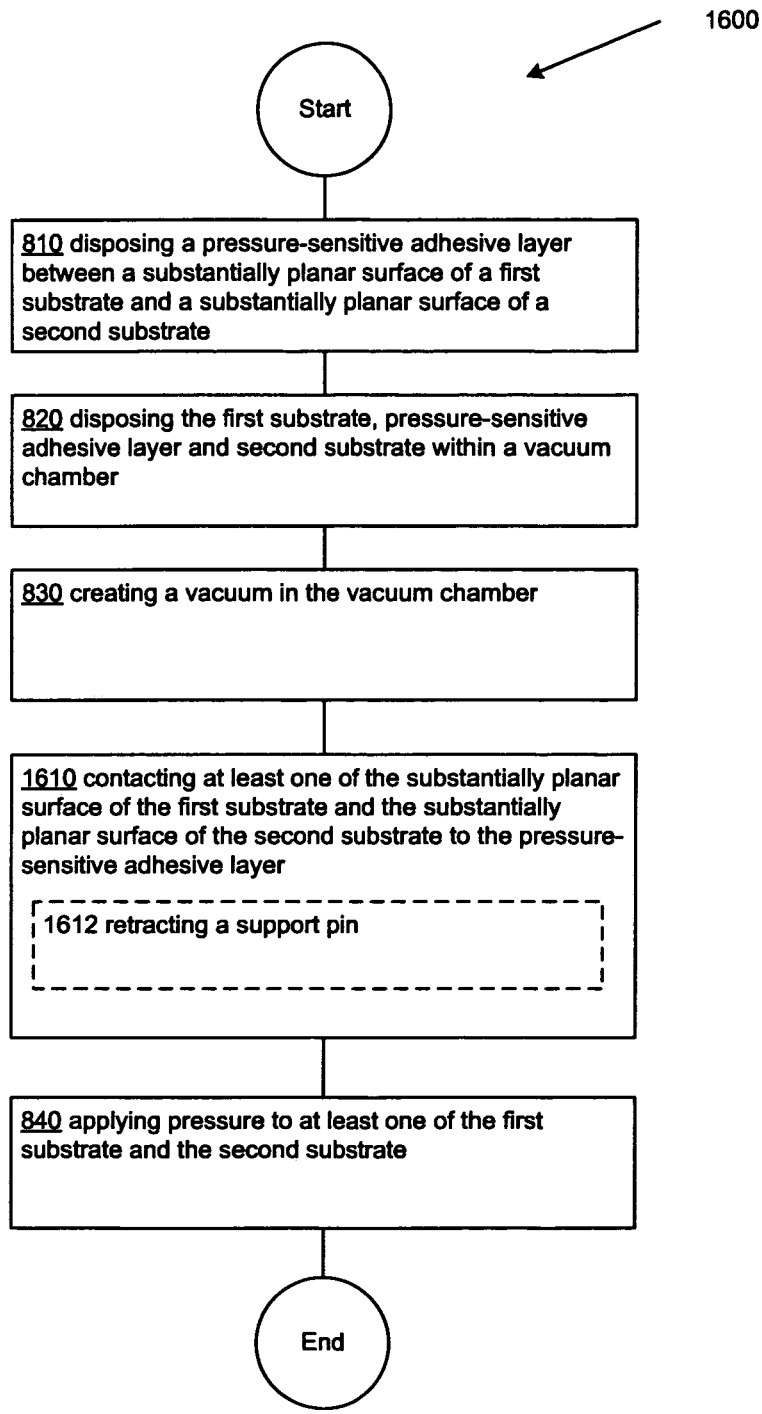
FIG. 16 is a high-level logic flowchart of a process.

FIG. 16 illustrates an operational flow 1600 representing example operations related to lamination of one or more substrates with a pressure sensitive adhesive. FIG. 16 illustrates an example embodiment where the example operational flow 800 of FIG. 8 may include at least one additional operation. Additional operations may include an operation 1610, and/or an operation 1612.

After a start operation, a disposing operation 810, a disposing operation 820, and a vacuum creation operation 830, the operational flow 1600 moves to a contacting operation 1610, where contacting at least one of the substantially planar surface of the first substrate and the substantially planar surface of the second substrate to the pressure-sensitive adhesive layer may occur. For example, as shown in FIGS. 1 through 7, at least one of the first substrate 101 and the second substrate 102 may be moved from a supported position where at least one of the first substrate 101 and the second substrate 102 is maintained in spatial separation from the pressure-sensitive adhesive layer 103 to a contacted position where at least one of the first substrate 101 and the second substrate 102 is brought into physical contact with the pressure-sensitive adhesive layer 103. Further, at the operation 1612, retracting a support pin may occur. For example, as shown in FIGS. 1 through 7, the retractable support pin 131 of the substrate support 130 which may support at least one of the first substrate 101 and the second substrate 102 in spatial separation from the pressure-sensitive adhesive layer 103 may be retracted so as to allow at least one of the first substrate 101 and the second substrate 102 to be brought into physical contact with the pressure-sensitive adhesive layer 103.

Figure 17:
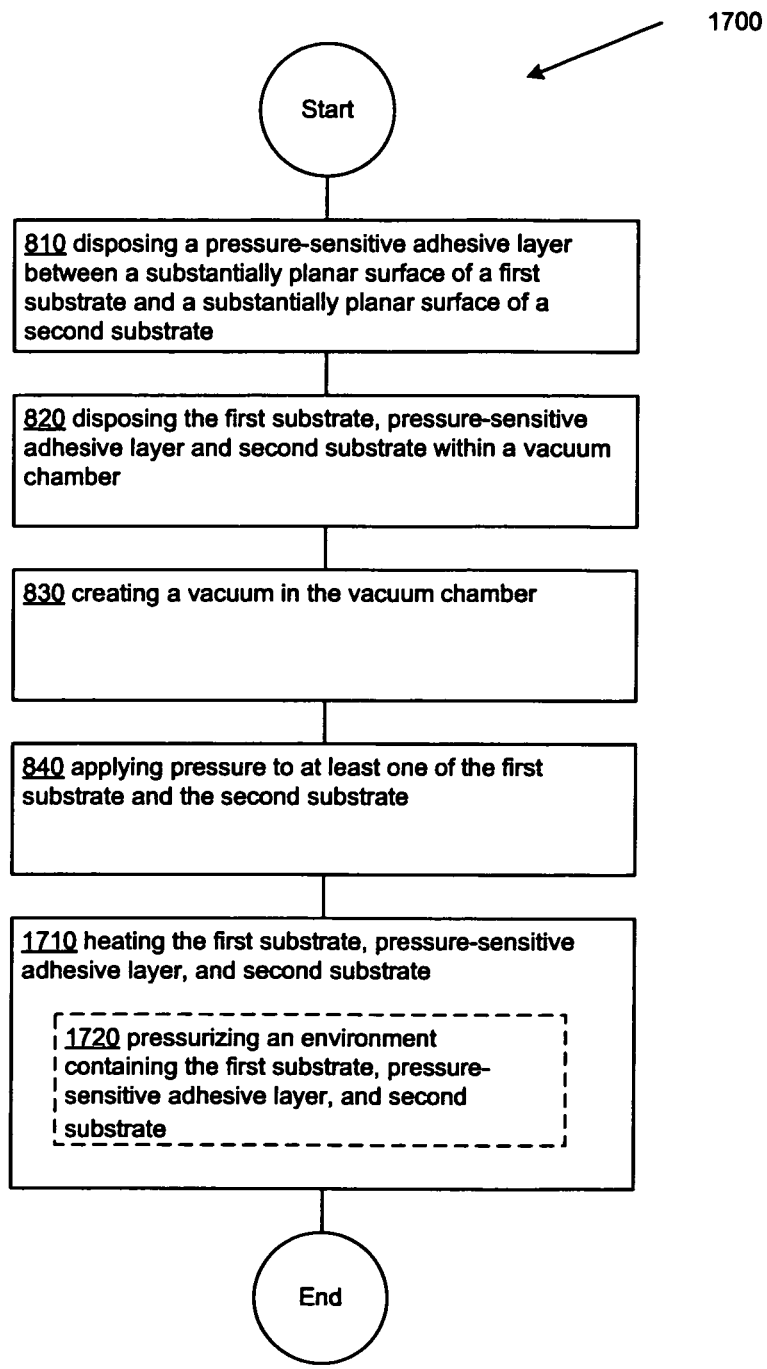
FIG. 17 is a high-level logic flowchart of a process.

FIG. 17 illustrates an operational flow 1700 representing example operations related to lamination of one or more substrates with a pressure sensitive adhesive. FIG. 16 illustrates an example embodiment where the example operational flow 800 of FIG. 8 may include at least one additional operation. Additional operations may include an operation 1710 and/or an operation 1720.

After a start operation, a disposing operation 810, a disposing operation 820, a vacuum creation operation 830, and a pressure application operation 840, the operational flow 1700 moves to a heating operation 1710, where heating at least one of the first substrate, pressure-sensitive adhesive layer, and second substrate may occur. For example, as shown in FIGS. 1 through 7, the first substrate 101, the second substrate 102 and the pressure-sensitive adhesive layer 103 may be heated by a heating element internal to the vacuum chamber 110 or disposed within an external heating apparatus, such as an autoclave. Such heating may serve to further set the pressure-sensitive adhesive layer 103. In particular applications, the heating may occur in an environment having a temperature of from about ambient to 200° C. and, more particularly, about 80° C.

Further, at operation 1720, pressurizing an environment containing the first substrate, pressure-sensitive adhesive layer, and second substrate may occur. For example, the first substrate 101, pressure-sensitive adhesive layer 103 and the second substrate 102 may be disposed in a pressure vessel in which the pressure may be elevated above ambient pressures. The elevated pressure may be from about 760 torr to about 7600 torr and, more particularly about 1520 torr.

Operations 1710 and 1720 may be conducted over a period of time of from about 2 to 5 hours. However, the amount of heat and pressure applied and the timing therefore may be a function of the heat and pressure required to effectively attach a selected pressure-sensitive adhesive layer 103 or the sensitivity of the first substrate 101 and the second substrate 102 to heat and/or pressure, as would be determinable by one of skill in the art. As such, any range of temperatures and pressures is fully contemplated by this disclosure.

It is believed that the lamination systems and methods and many of their attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

The invention claimed is:

1. A substrate lamination apparatus, the apparatus comprising:
   a vacuum chamber comprising a base portion;
   a flexible membrane, the flexible membrane partitioning the vacuum chamber into a first compartment and a second compartment;
   a substrate support; and
   a substrate alignment insert removable from both the base portion of the vacuum chamber and the substrate support, the substrate alignment insert including a generally planar base portion and a plurality of alignment guides extending upward from the planar base portion, the generally planar base portion and the plurality of alignment guides defining an aperture extending through the substrate alignment insert and being configured to receive at least a portion of a substrate and align the substrate within the vacuum chamber.

2. The apparatus of claim 1, further comprising:
   a first port disposed in a wall portion of the first compartment; and
   a second port disposed in a wall portion of the second compartment.

3. The apparatus of claim 1, wherein the flexible membrane further comprises:
   a silicone rubber membrane.

4. The apparatus of claim 1, wherein the flexible membrane has an elongation capacity of at least 100%.

5. The apparatus of claim 1, wherein the flexible membrane has a tear strength of at least 30 psi.

6. The apparatus of claim 1, wherein the substrate support further comprises:
   a retractable support pin.

7. The apparatus of claim 1, wherein the substrate support further comprises:
   a retractable support pin;
   an actuating mechanism.

8. The apparatus of claim 1, further comprising:
   a substrate mask configured to cover and protect a portion of the substrate during a lamination process.

9. The apparatus of claim 8, wherein the substrate mask further comprises:
   a mask aperture.

10. The apparatus of claim 1, wherein the vacuum chamber further comprises:
    a lid structure.

11. The apparatus of claim 10, wherein the vacuum chamber further comprises:
    a lid positioning mechanism.

12. The apparatus of claim 10, wherein the vacuum chamber further comprises:
    a locking mechanism.

13. The apparatus of claim 12, wherein the locking mechanism further comprises:
    an electromagnetic locking mechanism.

14. A substrate lamination system, the apparatus comprising:
    a vacuum chamber configured to receive a first substrate and a second substrate;
    a first and second flexible membranes, the first and second flexible membranes partitioning the vacuum chamber into a first compartment and a second compartment;
    a substrate support configured to support at least one of the first substrate and the second substrate in a generally vertical fashion, the substrate support being received in one of a plurality of apertures formed in a wall of the vacuum chamber;
    a vacuum pump;
    a compressor; and
    a control unit, wherein the control unit is configured to control operation of the vacuum pump to evacuate the vacuum chamber such that the first and second membranes apply pressure to the first and second substrates;
    wherein the first and second flexible membranes and the substrate support are configured such that prior to evacuation of the chamber the first and second flexible membranes are spaced apart from the first and second substrates.

15. The system of claim 14, wherein the control unit is configured to carry out the step:
    disposing a pressure-sensitive adhesive layer between a substantially planar surface of a first substrate and a substantially planar surface of a second substrate.

16. The system of claim 15, wherein the disposing a pressure-sensitive adhesive layer between a substantially planar surface of a first substrate and a substantially planar surface of a second substrate further comprises:
    disposing a sheet of pressure-sensitive adhesive between a substantially planar surface of a first substrate and a substantially planar surface of a second substrate.

17. The system of claim 15, wherein the disposing a pressure-sensitive adhesive layer between a substantially planar surface of a first substrate and a substantially planar surface of a second substrate further comprises:
    coating at least a portion of at least one of the substantially planar surface of the first substrate and the substantially planar surface of the second substrate with a pressure-sensitive adhesive.

18. The system of claim 14, wherein the control unit is configured to carry out the step:
    disposing the first substrate, pressure-sensitive adhesive layer and second substrate within a vacuum chamber.

19. The system of claim 18, wherein the disposing the first substrate, pressure-sensitive adhesive layer and second substrate within a vacuum chamber further comprises:
    co-aligning a portion of the first substrate with a portion of the second substrate.

20. The system of claim 18, wherein the disposing the first substrate, pressure-sensitive adhesive layer and second substrate within a vacuum chamber further comprises:
    maintaining at least a portion of at least one of the first substrate and second substrate in spatial separation from the pressure-sensitive adhesive layer.

21. The system of claim 20, wherein the maintaining at least a portion of at least one of the first substrate and second substrate in spatial separation from the pressure-sensitive adhesive layer further comprises:
    supporting at least one of the first substrate and the second substrate on a support pin.

22. The system of claim 21, wherein the supporting at least one of the first substrate and the second substrate on a support pin further comprises:
    supporting the at least one of the first substrate and the second substrate on a retractable support pin.

23. The system of claim 14, wherein the evacuating the vacuum chamber further comprises:
    evacuating a first portion of the vacuum chamber to a first pressure.

24. The system of claim 23, wherein the evacuating the vacuum chamber further comprises:
    evacuating a second portion of the vacuum chamber to a second pressure.

25. The system of claim 14, wherein the applying pressure to at least one of a first substrate and a second substrate by expanding the first and second flexible membranes by the application of pressure to a surface of the first and second flexible membranes.

26. The system of claim 25, wherein the expanding the first and second flexible membranes further comprises:
    expanding flexible membranes by the application of air pressure to surfaces of the first and second flexible membranes.

27. The system of claim 25, wherein the control unit is configured to control carrying out the step:
    masking a portion of at least one of the first substrate and second substrate from contact with the flexible membrane.

28. The system of claim 14, wherein the control unit is configured to control carrying out the step:
    contacting at least one of the substantially planar surface of the first substrate and the substantially planar surface of the second substrate to the pressure-sensitive adhesive layer.

29. The system of claim 28, wherein the contacting at least one of the substantially planar surface of the first substrate and the substantially planar surface of the second substrate to the pressure-sensitive adhesive layer further comprising:
    retracting a support pin.

30. The system of claim 14, wherein the control unit is configured to control carrying out the step:
    heating at least one of the first substrate, pressure-sensitive adhesive layer, and second substrate.

31. The system of claim 14, wherein the control unit is configured to control carrying out the step:
    pressurizing an environment containing the first substrate, pressure-sensitive adhesive layer, and second substrate.

32. The apparatus of claim 1, wherein the substrate alignment insert comprises a plurality of upstanding wall portions configured to align the substrate.

33. The system of claim 14, wherein the first and second flexible membranes are provided on opposite sides of the first second substrates.

* * * * *